(12) United States Patent
Shirai

(10) Patent No.: US 6,469,777 B2
(45) Date of Patent: Oct. 22, 2002

(54) SURVEYING INSTRUMENT HAVING AN OPTICAL DISTANCE METER

(75) Inventor: Masami Shirai, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/877,082

(22) Filed: Jun. 11, 2001

(65) Prior Publication Data

US 2001/0050764 A1 Dec. 13, 2001

(30) Foreign Application Priority Data

Jun. 12, 2000 (JP) ........................................ 2000-175221

(51) Int. Cl.⁷ ................................................ G01C 3/08
(52) U.S. Cl. ......................................... 356/5.1; 356/5.01
(58) Field of Search .............................. 356/3.01–5.15; 396/62, 84, 139, 141

(56) References Cited

U.S. PATENT DOCUMENTS

| | | | |
|---|---|---|---|
| 4,167,329 A | * 9/1979 | Jelalian et al. ................. | 356/5 |
| 4,567,362 A | * 1/1986 | Kunz .......................... | 250/201 |
| 4,636,068 A | 1/1987 | Niiho et al. .................... | 356/5 |
| 4,715,708 A | * 12/1987 | Ito ............................. | 356/72 |
| 4,830,485 A | * 5/1989 | Penney et al. ................. | 356/1 |
| 5,206,697 A | * 4/1993 | Schwartz ...................... | 356/5 |
| 5,512,760 A | * 4/1996 | Horijon et al. .............. | 250/559.29 |
| 5,760,905 A | 6/1998 | Sasagawa .................... | 356/375 |
| 5,774,208 A | 6/1998 | Abe ........................... | 356/4.01 |
| 5,815,251 A | 9/1998 | Ehbets et al. ............... | 356/5.01 |
| 5,886,777 A | 3/1999 | Hirunuma ................... | 356/5.12 |
| 5,949,531 A | 9/1999 | Ehbets et al. ............... | 356/5.01 |
| 6,226,076 B1 | * 5/2001 | Yoshida ....................... | 356/5.06 |
| 6,275,283 B1 | * 8/2001 | Hasson ....................... | 356/4.07 |
| 6,324,024 B1 | * 11/2001 | Shirai et al. ................. | 359/884 |

FOREIGN PATENT DOCUMENTS

| | | |
|---|---|---|
| JP | 8-510324 | 10/1996 |
| JP | 9-5426 | 1/1997 |
| JP | 9-105625 | 4/1997 |

* cited by examiner

*Primary Examiner*—Thomas H. Tarcza
*Assistant Examiner*—Brian Andrea
(74) *Attorney, Agent, or Firm*—Greenblum & Bernstein, P.L.C.

(57) ABSTRACT

A surveying instrument includes a distance-measuring optical system having an objective lens via which a distance from the surveying instrument to an object is measured; and an optical distance meter which includes a reflection member positioned behind the objective lens, a light-transmitting optical system for transmitting a measuring light toward the object via the reflection member and the objective lens, and a light-receiving optical system for receiving a portion of the measuring light which is reflected by the object, subsequently passed through the objective lens, and not interrupted by the reflection member. The light-receiving optical system includes a plurality of light-guiding optical systems, so that the measuring light which is reflected by the object is selectively incident on an end of one of the plurality of light-guiding optical systems in accordance with the distance from the surveying instrument to the object.

39 Claims, 14 Drawing Sheets

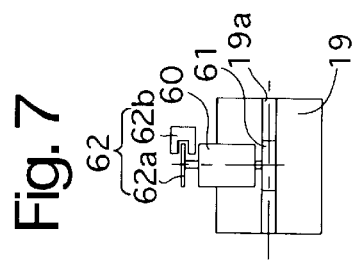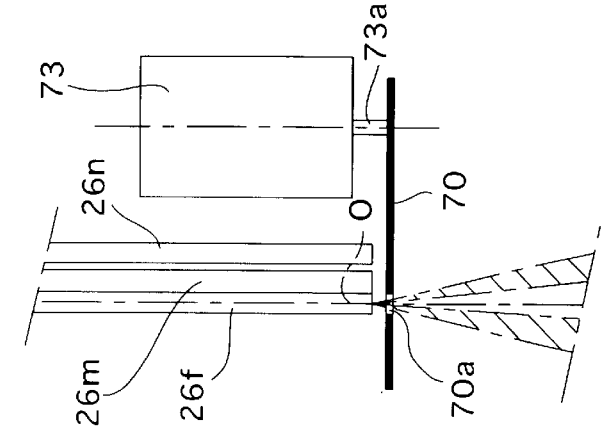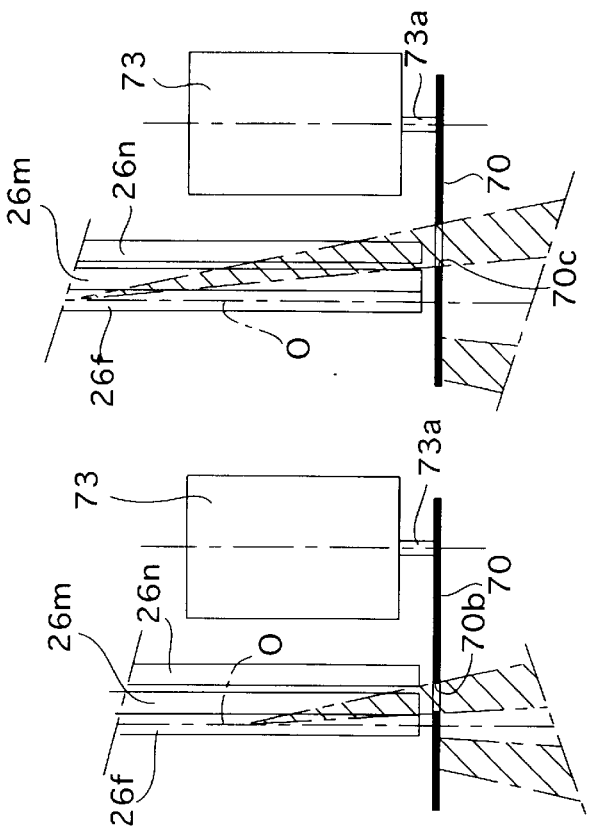

Fig. 12B
Fig. 12A
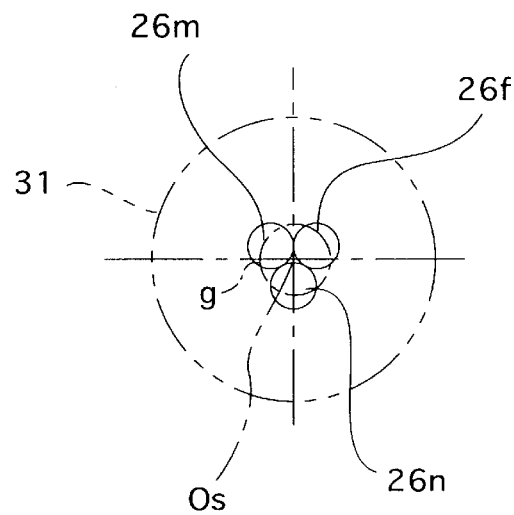
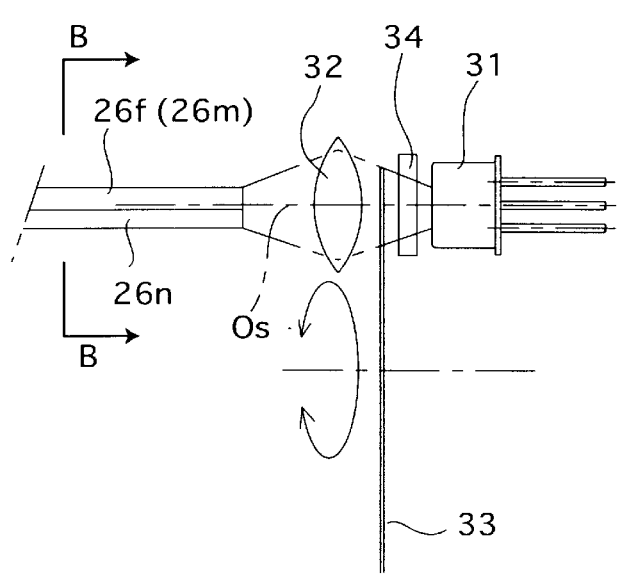
Fig. 13
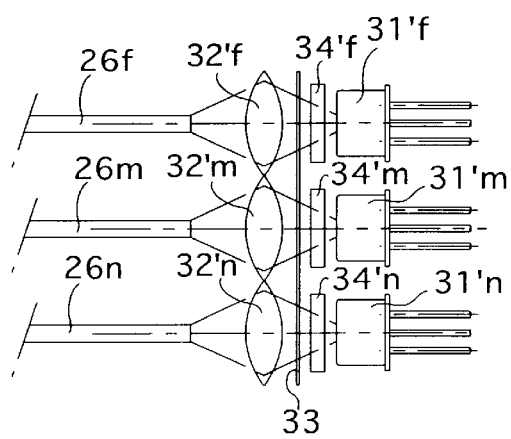

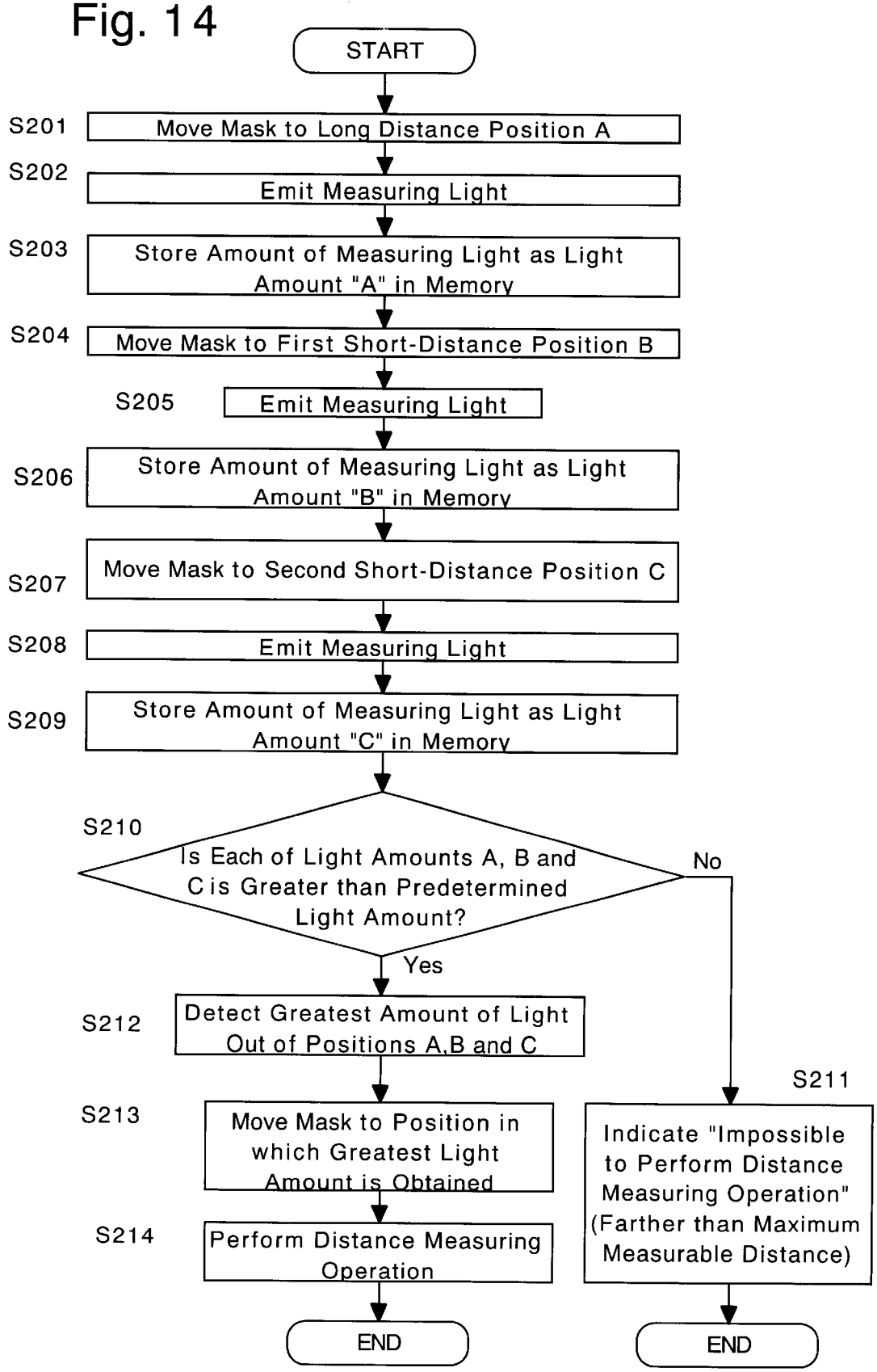

SURVEYING INSTRUMENT HAVING AN OPTICAL DISTANCE METER

BACKGROUND OF THE INVENTION

1. Field of the Invention

The present invention relates to a surveying instrument having an optical distance meter, and also relates to a surveying instrument having an optical distance meter and a focus detection device for detecting a focus state of a distance-measuring optical system such as a sighting telescope.

2. Description of the Related Art

When a surveyor measures the distance between two points, an electronic distance meter (EDM) designed as a surveying instrument is generally used. An electronic distance meter calculates the distance via the phase difference between a projecting light and a reflected light and via the initial phase of an internal reference light, or via the time difference between the projecting light and the reflected light.

A typical electronic distance meter is provided, behind the objective lens of a sighting telescope (distance-measuring optical system) thereof, with a light transmitting mirror positioned on the optical axis of the sighting telescope to project the measuring light toward a target (sighting object) through the center of the entrance pupil of the objective lens of the sighting telescope. The light which is reflected by the target and passed through the objective lens of the sighting telescope passes the peripheral space of the light transmitting mirror to be captured via a wavelength selection filter and a light receiving mirror.

In such an electronic distance meter, the light which is reflected by the target and passed through the objective lens of the sighting telescope is interrupted by the aforementioned light transmitting mirror by a greater amount as the target is closer to the electronic distance meter. If the light which is reflected by the target and passed through the objective lens of the sighting telescope is interrupted by the light transmitting mirror by a great amount, the light amount of the incident light upon the aforementioned light receiving mirror decreases, which deteriorates the precision in measuring the object distance or makes it impossible to perform a distance measuring operation. To prevent these problems from occurring, various methods have been proposed.

SUMMARY OF THE INVENTION

The present invention has been devised in view of the problems noted above, and accordingly, an object of the present invention is to provide a surveying instrument having an optical distance meter, wherein the aforementioned problems can be overcome in an easy manner without deteriorating the performance characteristics of the distance measuring operation of the optical distance meter when measuring the distance to a target at the maximum measurable distance.

Another object of the present invention is to provide a surveying instrument having an optical distance meter and a focus detection device for detecting a focus state of a distance-measuring optical system, wherein the aforementioned problems can be overcome in an easy manner without deteriorating the performance characteristics of the distance measuring operation of the optical distance meter when measuring the distance to a target at the maximum measurable distance.

To achieve the objects mentioned above, according to an aspect of the present invention, a surveying instrument is provided, including a distance-measuring optical system having an objective lens via which a distance from the surveying instrument to an object is measured; and an optical distance meter which includes a reflection member positioned behind the objective lens, a light-transmitting optical system for transmitting a measuring light toward the object via the reflection member and the objective lens, and a light-receiving optical system for receiving a portion of the measuring light which is reflected by the object, subsequently passed through the objective lens and not interrupted by the reflection member. The light-receiving optical system includes a plurality of light-guiding optical systems, so that the measuring light which is reflected by the object is selectively incident on an end of one of the plurality of light-guiding optical systems in accordance with the distance from the surveying instrument to the object.

In an embodiment, a diameter of at least one light-guiding optical system of the plurality of light-guiding optical systems, to which the measuring light reflected by the object is incident on, is greater as the object distance for which at least one light-guiding optical system is used is longer.

In an embodiment, the surveying instrument further includes a light shield mask having a plurality of apertures, wherein the measuring light reflected by the object is selectively incident on the end of the one of the plurality of light-guiding optical systems via one of the plurality of apertures.

In an embodiment, diameters of the plurality of apertures are different from one another, the diameters of the plurality of light-guiding optical systems being identical to one another.

In an alternative embodiment, diameters of the plurality of apertures are different from one another, wherein the diameters of the plurality of light-guiding optical systems correspond to the diameters of the plurality of apertures of the light shield mask.

The surveying instrument can further include a moving device for moving the light shield mask so that the measuring light reflected by the object can be selectively incident on the end of the one of the plurality of light-guiding optical systems.

Preferably, the distance-measuring optical system includes a focus adjustment lens which is moved to bring the object into focus; the surveying instrument further including a lens position detection device which detects an axial position of the focus adjustment lens, the moving device moving the light shield mask in accordance with the axial position of the focus adjustment lens that is detected by the lens position detection device.

Preferably, a controller is provided, which controls the moving device to move the light shield mask in accordance with a state of the light-receiving optical system when the light-receiving optical system receives the measuring light reflected by the object.

The controller can include a mask position detector for detecting a position of the light shield mask in which an amount of the measuring light reflected by the object and received by the light-receiving optical system becomes maximum. The controller controls the moving device to move the light shield mask in accordance with the position of the light shield mask that is detected by the mask position detector.

The controller can control, for example, the moving device to move the light shield mask so that the measuring light reflected by the object is incident on an end of another one of the plurality of light-guiding optical systems in the case where an amount of the measuring light reflected by the object and received by the light-receiving optical system via the one of the plurality of light-guiding optical systems, at a predetermined amount of time, is not greater than a predetermined amount of light.

In an embodiment, the central axes of the incident end surfaces of the plurality of light-guiding optical systems are positioned on a straight line.

In an alternative embodiment, the light-receiving optical system includes a light-receiving element on which the measuring light reflected by the object is incident via the plurality of light-guiding optical systems; wherein the central axes of the exit end surfaces of the plurality of light-guiding optical systems are positioned on a circle about an axis of the light-receiving element.

In an embodiment, the light-receiving optical system includes a plurality of light-receiving elements on which the measuring light reflected by the object is incident via the plurality of light-guiding optical systems, respectively.

Preferably, each of the plurality of light-receiving elements is an optical fiber.

The distance-measuring optical system can be a sighting telescope for sighting the object.

Preferably, the reflection member is made of a parallel-plate mirror having a front surface and a rear surface which are parallel to each other. The front surface faces the objective lens and is formed as a light transmitting mirror which reflects the measuring light to be projected toward the object via the objective lens. The rear surface is formed as a light receiving mirror which reflects the measuring light reflected by the object. The measuring light which is reflected by the object, subsequently passed through the objective lens and not interrupted by the reflection member, is reflected by the light receiving mirror to be selectively incident on the end of the one of the plurality of light-guiding optical systems in accordance with the distance from the surveying instrument to the object.

Preferably, the light shield mask has a sector shape.

The light-receiving optical system can include a wavelength selection mirror positioned between the reflection member and the focus adjustment lens.

According to another aspect of the present invention, a surveying instrument is provided, including a distance-measuring optical system having an objective lens via which a distance from the surveying instrument to an object is measured; an optical distance meter which includes a reflection member positioned behind the objective lens, a light-transmitting optical system for transmitting a measuring light via the reflection member and the objective lens, and a light-receiving optical system for receiving light which is reflected by the object, subsequently passed through the objective lens and not interrupted by the reflection member, the light-receiving optical system including a light-guiding optical system, the measuring light which is reflected by the object being incident on an incident end surface of the light-guiding optical system, a diameter of the light-receiving optical system being determined so that the measuring light which is reflected by the object can be incident on the incident end surface of the light-guiding optical system regardless of the distance from the surveying instrument to the object; and a light shield mask having a central aperture via which a central portion of the incident end surface is exposed with respect to the reflection member, and at least one side aperture via which an off-center portion of the incident end surface is exposed with respect to the reflection member, a diameter of each the at least one side aperture being smaller than a diameter of the central aperture.

In an embodiment, at least two side apertures are provided, a diameter of each of the at least two side apertures is smaller as the each of the at least two side apertures is farther from the central aperture.

The above-mentioned at least one side aperture can be communicatively connected with the central aperture.

Preferably, each of the plurality of light-receiving elements is an optical fiber.

The distance-measuring optical system can be a sighting telescope for sighting the object.

In an embodiment, the reflection member is made of a parallel-plate mirror having front and rear surfaces parallel to each other. The front surface faces the objective lens and is formed as a light transmitting mirror which reflects the measuring light to be projected toward the object via the objective lens. The rear surface is formed as a light receiving mirror which reflects the measuring light reflected by the object. The measuring light which is reflected by the object, subsequently passed through the objective lens and not interrupted by the reflection member, is reflected by the light receiving mirror to be incident on the incident end surface of the light-guiding optical system.

The above-described light shield mask can have a disc shape.

According to another aspect of the present invention, a surveying instrument is provided, including a distance-measuring optical system having an objective lens via which a distance from the surveying instrument to an object is measured; an optical distance meter which includes a reflection member positioned behind the objective lens, a light-transmitting optical system for transmitting a measuring light toward the object via the reflection member and the objective lens, and a light-receiving optical system for receiving light which is reflected by the object, subsequently passed through the objective lens and not interrupted by the reflection member; and a focus detection device which detects a focus state of the distance-measuring optical system. The light-receiving optical system includes a plurality of light-guiding optical systems; a light shield mask having a plurality of apertures via which the measuring light reflected by the object is selectively incident on an end of one of the plurality of light-guiding optical systems in accordance with the distance from the surveying instrument to the object; a moving device for moving the light shield mask so that the measuring light reflected by the object can be selectively incident on the end of the one of the plurality of light-guiding optical systems; and a controller which controls the moving device to move the light shield mask so that the measuring light reflected by the object is incident on the end of the one of the plurality of light-guiding optical systems in accordance with the focus state that is detected by the focus detection device.

In an alternative to the above-described aspect of the present invention, a surveying instrument is provided, equipped with an autofocus system, including a distance-measuring optical system having an objective lens via which a distance from the surveying instrument to an object is measured; an optical distance meter which includes a reflection member positioned behind the objective lens, a light-transmitting optical system for transmitting a measuring light toward the object via the reflection member and the objective lens, and a light-receiving optical system for receiving light which is reflected by the object, subsequently passed through the objective lens and not interrupted by the reflection member; a focus detection device which detects a focus state of the distance-measuring optical system; and an autofocus mechanism for moving a focusing lens of the distance-measuring optical system to bring the object into focus in accordance with the focus state that is detected by the focus detection device, the autofocus mechanism including a lens position detection device which detects an axial position of the focusing lens. The light-receiving optical system includes a plurality of light-guiding optical systems; a light shield mask having a plurality of apertures via which the measuring light reflected by the object is selectively incident on an end of one of the plurality of light-guiding optical systems in accordance with the distance from the surveying instrument to the object; a moving device for moving the light shield mask so that the measuring light reflected by the object can be selectively incident on the end of the one of the plurality of light-guiding optical systems; and a controller which controls the moving device to move the light shield mask so that the measuring light reflected by the object is incident on the end of the one of the plurality of light-guiding optical systems in accordance with the axial position of the focusing lens that is detected by the lens position detection device.

In an embodiment, diameters of the plurality of apertures are different from one another, and the diameters of the plurality of light-guiding optical systems are identical to one another.

In an alternative embodiment, the diameters of the plurality of apertures can be different from one another so that the diameters of the plurality of light-guiding optical systems correspond to the diameters of the plurality of apertures of the light shield mask.

In an embodiment, the distance-measuring optical system includes a sighting telescope for sighting the object. The focus detection device includes a phase-difference detection type focus detection device which detects the focus state of the sighting telescope from a correlation between a pair of images respectively formed by two light bundles which are respectively passed through two different pupil areas on the objective lens. Elements of the optical distance meter are positioned so as not to interfere with the two different pupil areas.

In an embodiment, the central axes of the incident end surfaces of the plurality of light-guiding optical systems are positioned on a straight line.

In an embodiment, the light-receiving optical system includes a light-receiving element on which the measuring light reflected by the object is incident via the plurality of light-guiding optical systems. The central axes of the exit end surfaces of the plurality of light-guiding optical systems are positioned on a circle about an axis of the light-receiving element.

In an embodiment, the light-receiving optical system includes a plurality of light-receiving elements on which the measuring light reflected by the object is incident via the plurality of light-guiding optical systems, respectively.

Preferably, each of the plurality of light-receiving elements is an optical fiber.

The present disclosure relates to subject matter contained in Japanese Patent Application No.2000-175221 (filed on Jun. 12, 2000) which is expressly incorporated herein by reference in its entirety.

BRIEF DESCRIPTION OF THE DRAWINGS

The present invention will be described below in detail with reference to the accompanying drawings in which:

FIG. 7 is a schematic plan view of a focusing-lens drive mechanism provided in the electronic distance meter shown in FIG. 6, viewed in the direction of an arrow VI shown in FIG. 6;

FIG. 8A is an enlarged side elevational view of an incident end portion of a light-receiving optical fiber bundle and peripheral elements thereof in the second embodiment of the electronic distance meter shown in FIG. 7, showing a state of the measuring light incident on the incident end surface of the light-receiving optical fiber bundle when the electronic distance meter measures the distance to a sighting object located at a long distance;

FIG. 8B is a view similar to that of FIG. 8A and shows a state of the measuring light incident on the incident end surface of the light-receiving optical fiber bundle when the electronic distance meter measures the distance to a sighting object located at a first short distance;

FIG. 8C is a view similar to that of FIG. 8A and shows a state of the measuring light incident on the incident end surface of the light-receiving optical fiber bundle when the electronic distance meter measures the distance to a sighting object located at a second short distance;

FIG. 12A is an enlarged side elevational view of an exit end of the light-receiving optical fiber bundle and peripheral elements thereof in the second embodiment of the electronic distance meter shown in FIG. 6;

FIG. 12B is a cross sectional view of the light-receiving optical fiber bundle, taken along the VII—VII line in FIG. 12A, showing the positional relationship between the exit end surface of the light-receiving optical fiber bundle and the light-receiving element;

FIG. 13 is an enlarged side elevational view of another embodiment of a fundamental portion of the optical distance meter shown in the second embodiment of the electronic distance meter shown in FIG. 6 in the case where the light-receiving element is disposed for each optical fiber of the light-receiving optical fiber bundle;

FIG. 14 is a flow chart showing another embodiment of the light-shield-mask driving process that is performed by the control circuit shown in FIG. 10;

DESCRIPTION OF THE PREFERRED EMBODIMENTS

Figure 1:
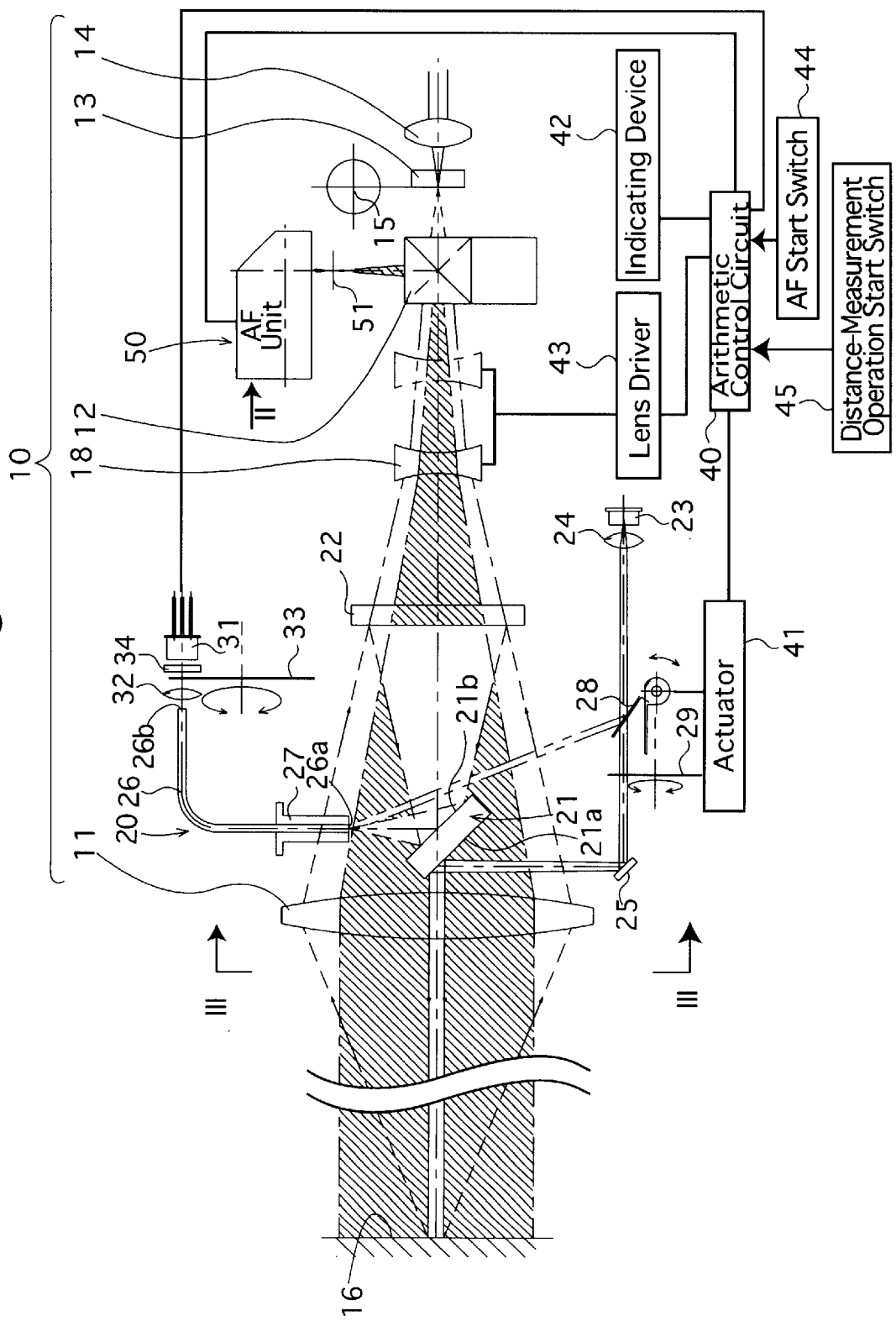
FIG. 1 is a schematic diagram of the first embodiment of an electronic distance meter equipped with an autofocus system, according to the present invention.

FIGS. 1 through 5 show the first embodiment of an electronic distance meter (EDM) equipped with an autofocus system, according to the present invention. The electronic distance meter designed as a surveying instrument is provided with a sighting telescope (sighting optical system/distance-measuring optical system) 10 and an optical distance meter 20. As shown in FIG. 1, the sighting telescope 10 is provided with an objective lens 11, a focusing lens (focus adjustment lens) 18, a Porro-prism erecting system 12, a focal-plane plate (reticle plate) 13, and an eyepiece lens 14, in that order from the object side (i.e., left to right as shown in FIG. 1). The focal-plane plate 13 is provided thereon with a reticle (cross hair) 15. The focusing lens 18 is guided in a direction of an optical axis of the sighting telescope 10. The image of a sighting object 16 that is formed through the objective lens 11 can be precisely focused on the front surface (the surface facing the objective lens 11) of the focal-plane plate 13 by adjusting the axial position of the focusing lens 18 in accordance with the distance of the sighting object 16 with respect to the sighting telescope 10. The user (surveyor) of the surveying instrument sights a magnified image of the sighting object 16, which is focused on the focal-plane plate 13, via the eyepiece 14.

The electronic distance meter is provided, behind the objective lens 11 of the sighting telescope 10, with a light transmitting/receiving mirror (reflection member) 21 and a wavelength selection mirror (wavelength selection filter) 22, which are arranged in that order from the object side. The light transmitting/receiving mirror 21 is made of a parallel-plate mirror having front and rear parallel surfaces positioned on the optical axis of the objective lens 11. The front surface of the parallel-plate mirror which faces the objective lens 11 is formed as a light transmitting mirror 21a, while the rear surface of the parallel-plate mirror which faces the wavelength selection mirror 22 is formed as a light receiving mirror 21b. The light receiving mirror 21b and the wavelength selection mirror 22 are fundamental optical elements of a light-receiving optical system of the optical distance meter 20.

The optical distance meter 20 is provided with a light-emitting element (laser diode) 23 which emits light (measuring light) having a specific wavelength. The measuring light emitted from the light-emitting element 23 is incident on the light transmitting mirror 21a via a collimating lens 24 and a fixed mirror 25. The measuring light, emitted from the light-emitting element 23 to be incident on the light transmitting mirror 21a, is reflected thereby to proceed toward the sighting object along the optical axis of the objective lens 11. The collimating lens 24, the fixed mirror 25 and the light transmitting mirror 21a (light transmitting/receiving mirror 21) are fundamental optical elements of a light-transmitting optical system of the optical distance meter 20.

The portion of the measuring light which is reflected by the sighting object 16, subsequently passed through the objective lens 11 which is not interrupted by the light transmitting/receiving mirror 21 is eventually reflected back to the light receiving mirror 21b by the wavelength selection mirror 22. Thereafter, the light receiving mirror 21b reflects the incident measuring light so as to make the measuring light enter at an incident end surface 26a of a light-receiving optical fiber bundle 26. A fiber holder 27 supports the incident end of the light-receiving optical fiber bundle 26 which has the incident end surface 26a. The fiber holder 27 is immovably supported together with the light transmitting/receiving mirror 21 by a fixing device (not shown) provided in a space behind the objective lens 11.

The electronic distance meter is provided between the light-emitting element 23 and the fixed mirror 25, on a distance-measuring optical path, with a switching mirror 28 and an ND filter 29. The light (measuring light) emitted by the light-emitting element 23 is incident on the fixed mirror 25 when the switching mirror 28 is retracted from the distance-measuring optical path between the collimating lens 24 and the fixed mirror 25, and the light (internal reference light) emitted by the light-emitting element 23 is reflected by the switching mirror 28 to be incident directly on the incident end surface 26a of the light-receiving optical fiber bundle 26 when the switching mirror 28 is positioned in the distance-measuring optical path between the collimating lens 24 and the fixed mirror 25. The ND filter 29 is used to adjust the amount of light of the measuring light incident on the sighting object 16.

The electronic distance meter is provided between an exit end surface 26b of the light-receiving optical fiber bundle 26 and a light-receiving element 31 with a condenser lens 32, an ND filter 33 and a band-pass filter 34, in that order from the exit end surface 26b to the light-receiving element 31. The light-receiving element 31 is connected to an arithmetic control circuit (controller) 40. The arithmetic control circuit 40 is connected to an actuator 41 which drives the switching mirror 28, and an indicating device (e.g., an LCD panel) 42 which indicates the calculated distance.

As is known in the art, the optical distance meter 20 establishes two different states: one state wherein the measuring light emitted by the light-emitting element 23 is supplied to the fixed mirror 25, and another state wherein the same light (internal reference light) is directly supplied to the incident end surface 26a of the light-receiving optical fiber bundle 26, which are determined in accordance with the switching state of the switching mirror 28 driven by the arithmetic control circuit 40 via the actuator 41. As described above, the measuring light supplied to the fixed mirror 25 is projected toward the sighting object 16 via the light-transmitting mirror 21a and the objective lens 11, and the measuring light reflected by the sighting object 16 is incident on the incident end surface 26a via the objective lens 11, the wavelength selection mirror 22, and the light receiving mirror 21b. Thereafter, both the measuring light reflected by the sighting object 16 to be eventually incident on the incident end surface 26a, and the internal reference light directly supplied to the incident end surface 26a via the switching mirror 28 are received by the light-receiving element 31. The arithmetic control circuit 40 detects the phase difference between the projecting light and the reflected light and the initial phase of the internal reference light, or the time difference between the projecting light and the reflected light, to calculate the distance from the electronic distance meter to the sighting object 16. The calculated distance is indicated by the indicating device 42. Such an operation of calculating the distance from the phase difference between the projecting light and the reflected light and from the initial phase of the internal reference light, or from the time difference between the projecting light and the reflected light is well known in the art.

Figure 2:
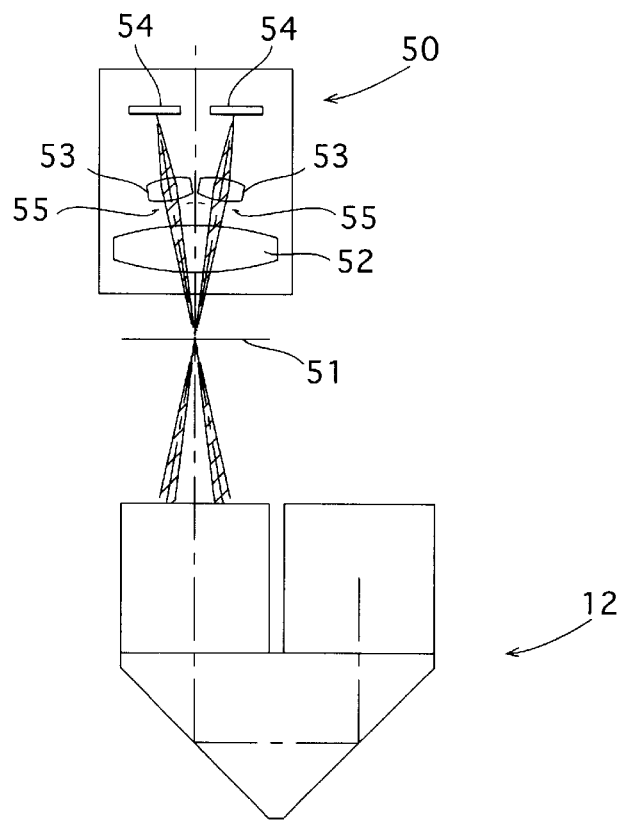
FIG. 2 is a conceptual diagram of a focus detecting device and a Porro-prism erecting system, as viewed in the direction of an arrow II shown in FIG. 1.

The Porro-prism erecting system 12 is provided with a beam splitting surface which splits the incident light bundle into two light bundles, so that one of the two light bundles proceeds toward a phase-difference detection type AF sensor unit (focus detecting device) 50 while the other light bundle proceeds toward the eyepiece 14. A reference focal plane 51 is formed between the Porro-prism erecting system 12 and the AF sensor unit 50, and is located at a position optically equivalent to the position at which the reticle 15 of the focal-plane plate 13 is placed. The AF sensor unit 50 detects the focus state (i.e., the amount of defocus and direction of focal shift) on the reference focal plane 51. FIG. 2 shows a conceptual diagram of the AF sensor unit 50 and the Porro-prism erecting system 12. The AF sensor unit 50 includes a condenser lens 52, a pair of separator lenses 53, a pair of separator masks 55 located in the close vicinity of the pair of separator lenses 53, and a pair of line sensors (e.g., multi segment CCD sensors) 54 located behind the respective separator lenses 53. The pair of separator lenses 53 are arranged apart from each other by the base length. The image of the sighting object 11 formed on the reference focal plane 51 is separated into two images by the pair of separator lenses 53 to be respectively formed on the pair of line sensors 54. Each of the pair of line sensors 54 includes an array of photoelectric converting elements. Each photoelectric converting element converts the received light of an image into electric charges which are integrated (accumulated), and outputs as an integrated electric charge to the arithmetic control circuit 40 to constitute AF sensor data. The arithmetic control circuit 40 calculates an amount of defocus through a predetermined defocus operation in accordance with a pair of AF sensor data respectively input from the pair of line sensors 54. In an autofocus operation, the arithmetic control circuit 40 drives the focusing lens 18 to bring the sighting object into focus via a lens driver (see FIG. 1) 43 in accordance with the calculated amount of defocus. The defocus operation is well-known in the art. An AF start switch 44 and a distance-measurement operation start switch 45 are connected to the arithmetic control circuit 40.

The AF sensor unit 50 detects an in-focus state from the pair of images respectively formed on the pair of line sensors 54 by two light bundles which are respectively passed through two different pupil areas 11A and 11B on the objective lens 11. The shape of each of the two pupil areas 11A and 11B a re determined by the shape of the aperture formed on a corresponding one of a pair of separator masks 55 which are respectively positioned in the vicinity of the pair of separator lenses 53 between the condenser lens 52 and the pair of separator lenses 53. It should be noted that the hatched areas seen in FIGS. 1 through 3 conceptually indicate areas which correspond to the pupil areas determined by the apertures of the pair of separator masks 55.

Figure 3:
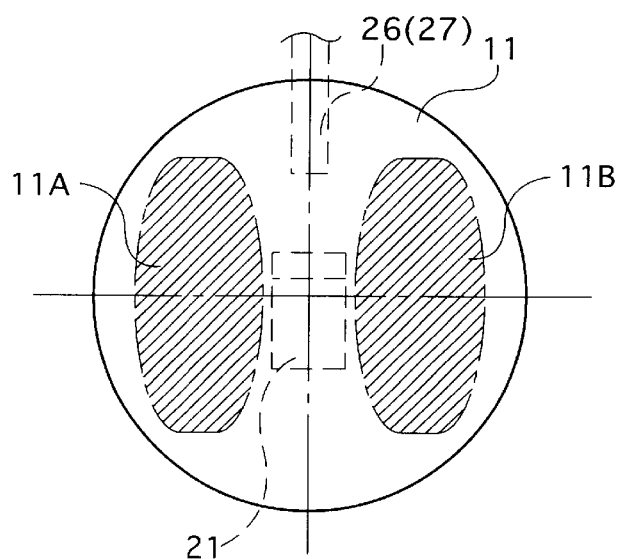
FIG. 3 is an explanatory view of an objective lens of a sighting telescope, as viewed in the direction of arrows III shown in FIG. 1, showing the positional relationship among two pupil areas defined on the objective lens, a light transmitting/receiving mirror, and a light-receiving optical fiber bundle.

FIG. 3 shows the positional relationship between the two pupil areas 11A and 11B and the positional relationship between the light transmitting/receiving mirror 21 and the light-receiving optical fiber bundle 26 (the fiber holder 27) of the optical distance meter 20. Although the positions, shapes and directions of the two pupil areas 11A and 11B are determined by the condenser lens 52, the pair of separator lenses 53, the pair of separator masks 55, and the array of photoelectric converting elements of each line sensor 54 so as to satisfy the performance of autofocus, the position of the two pupil areas 11A and 11B relative to the center of the objective lens 11 can be determined relatively freely. In addition, the positions of the two pupil areas 11A and 11B are determined so as not to interfere with the optical path of the measuring light reflected by the light transmitting mirror 21a. In other words, the light transmitting/receiving mirror 21 is positioned so as not to interfere with the two pupil areas 11A and 11B. In the present embodiment of the electronic distance meter, although the sighting telescope 10 is used as a distance-measuring optical system of the electronic distance meter, another optical system which is independent of the sighting telescope 10 can be used as a distance-measuring optical system of the electronic distance meter.

Figure 4A:
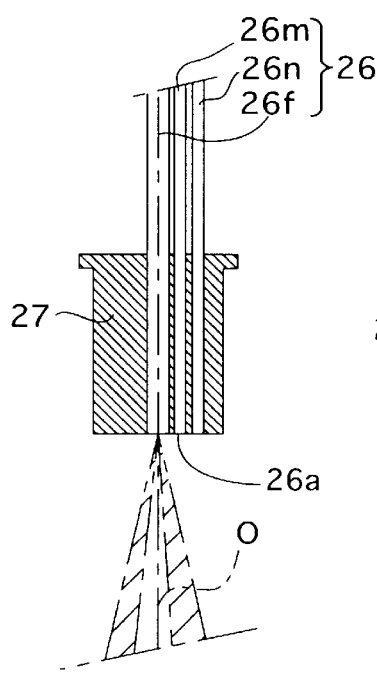
FIG. 4A is an enlarged side elevational view of an incident end of the light-receiving optical fiber bundle and a fiber holder which holds the incident end portion of the light-receiving optical fiber bundle, showing a state of the measuring light incident on the incident end surface of the light-receiving optical fiber bundle when the electronic distance meter measures the distance to a sighting object located at a long distance.
Figure 4B:
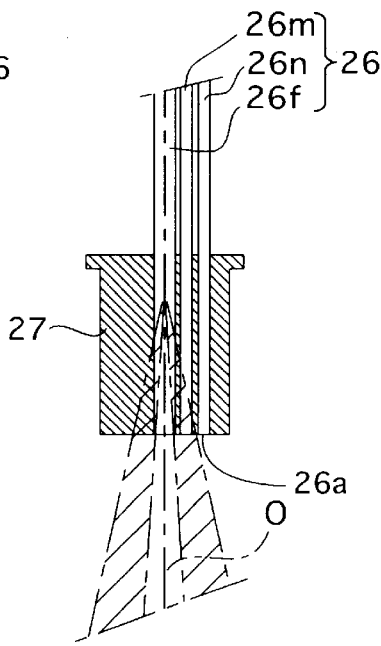
FIG. 4B is a view similar to that of FIG. 4A and shows another state of the measuring light incident on the incident end surface of the light-receiving optical fiber bundle when the electronic distance meter measures the distance to a sighting object located at a first short distance.
Figure 4C:
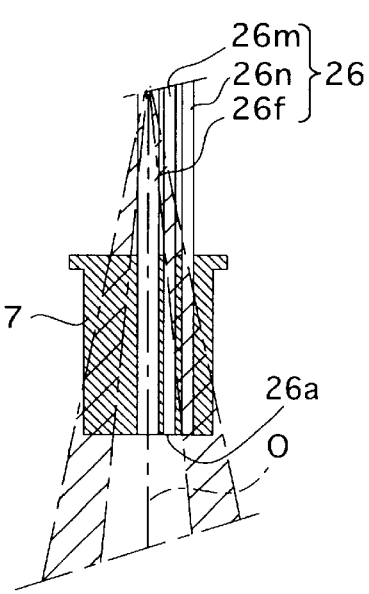
FIG. 4C is a view similar to that of FIG. 4A and shows another state of the measuring light incident on the incident end surface of the light-receiving optical fiber bundle when the electronic distance meter measures the distance to a sighting object located at a second short distance.

In the present embodiment of the electronic distance meter having the above described structure, the light-receiving optical fiber bundle 26 of the optical distance meter 20 consists of three light-receiving optical fibers, i.e., a first light-receiving optical fiber (light-guiding optical system) 26m, a second light-receiving optical fiber (light-guiding optical system) 26n and a third light-receiving optical fiber (light-guiding optical system) 26f. The first, second and third light-receiving optical fibers 26m, 26n and 26f are held by the fiber holder 27 so that the central axes of the incident end surfaces of the first, second and third light-receiving optical fibers 26m, 26n and 26f are positioned on a straight line (a horizontal straight line as viewed in each of FIGS. 4A, 4B and 4C) as shown in FIGS. 4A, 4B and 4C so that a sufficient amount of the measuring light reflected by the sighting object 16 is incident on the incident end surface 26a of the light-receiving optical fiber bundle 26 regardless of whether the sighting object 16 is positioned at a short distance or long distance. For instance, the measuring light reflected by the sighting object 16 is received by the first light-receiving optical fiber 26m when the sighting object 16 is located at a distance (first short distance) of approximately 2.5 meters, the second light-receiving optical fiber 26n when the sighting object 16 is located at a distance (second short distance) of approximately 1 meter, or the third light-receiving optical fiber 26f when the sighting object 16 is located at a long distance which is greater than the first short distance. Namely, a light-receiving optical fiber on the incident end surface of which the measuring light reflected by the sighting object 16 is made incident is selected from the first, second and third light-receiving optical fibers 26m, 26n and 26f in accordance with the calculated distance since the incident point of that measuring light on the incident end surface 26a which is reflected by the sighting object 16, subsequently passed through the objective lens 11 and not interrupted by the light transmitting/receiving mirror 21 varies in accordance with a variation of the distance from the electronic distance meter to the sighting object 16 as shown in FIGS. 4A, 4B and 4C. As shown in FIGS. 4A, 4B and 4C, the incident end portion of the third light-receiving optical fiber 26f, which is held by the fiber holder 27, extends so that the axis of the incident end portion of the third light-receiving optical fiber 26f is coincident with an axis O of the measuring light incident on the incident end surface 26a of the light-receiving optical fiber bundle 26. In contrast to the incident end portion of the third light-receiving optical fiber 26f, the incident end portion of the first light-receiving optical fiber 26m, which is also held by the fiber holder 27, extends so that the axis of the incident end portion of the first light-receiving optical fiber 26m is parallel to and deviates from the axis O of the measuring light incident on the incident end surface 26a by a predetermined distance (first distance), while the incident end portion of the second light-receiving optical fiber 26n, which is also held by the fiber holder 27, extends so that the axis of the incident end portion of the second light-receiving optical fiber 26n is parallel to and deviates from the axis O of the measuring light incident on the incident end surface 26a by another predetermined distance (second distance) which is longer than the aforementioned first distance.

FIG. 4A shows a state of the measuring light (indicated by hatched areas) incident on the incident end surface 26a of the light-receiving optical fiber bundle 26 when the electronic distance meter measures the distance therefrom to the sighting object 16 located at the long distance. FIG. 4B shows another state of the measuring light (indicated by hatched areas) incident on the incident end surface 26a of the light-receiving optical fiber bundle 26 when the electronic distance meter measures the distance to the sighting object 16 located at the first short distance. FIG. 4C shows another state of the measuring light (indicated by hatched areas) incident on the incident end surface 26a of the light-receiving optical fiber bundle 26 when the electronic distance meter measures the distance to the sighting object 16 located at the second short distance. Although the measuring light is not at all incident on either the first light-receiving optical fiber 26m or the second light-receiving optical fiber 26n when the electronic distance meter measures the distance therefrom to the sighting object 16 located at the long distance as shown in FIG. 4A, light having an adverse effect on the distance measurement such as direct or reflected sunlight is incident on each of the first and second light-receiving optical fibers 26m and 26n. Specifically when the electronic distance meter measures the distance therefrom to the sighting object 16 located at a long distance, such an adverse effect on the distance measurement becomes great since the measuring light incident on the incident end surface 26a of the light-receiving optical fiber bundle 26 is weak. Accordingly, the diameter of each of the first and second light-receiving optical fibers 26m and 26n is determined smaller than that of the third light-receiving optical fiber 26f. The diameters of the first and second light-receiving optical fibers 26m and 26n are the same. When the electronic distance meter measures the distance therefrom to the sighting object 16 located at a short distance, no problem arises even with the first and second light-receiving optical fibers 26m and 26n each having a small diameter, since a sufficient amount of the measuring light is incident on the incident end surface 26a of the light-receiving optical fiber bundle 26.

Figure 5:
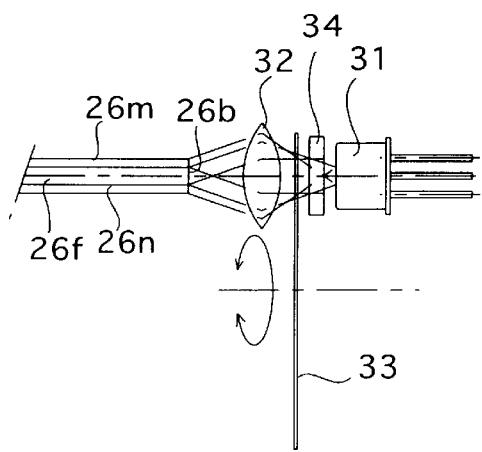
FIG. 5 is an enlarged side elevational view of an exit end of the light-receiving optical fiber bundle and peripheral elements thereof.

As shown in FIG. 5, the exit end portions of the first, second and third light-receiving optical fibers 26m, 26n and 26f are closely tied in a bundle so as to extend linearly with respect to each other. The light bundle which is passed through each of the first, second and third light-receiving optical fibers 26m, 26n and 26f is incident on the light-receiving element 31 via the condenser lens 32, the ND filter 33 and the band-pass filter 34.

The electronic distance meter equipped with an autofocus system which has the above described structure performs a distance measuring operation in a manner such as described in the following description. In the first step, a surveyor (user) aims the sighting telescope 10 at the sighting object 16 so that the optical axis of the sighting telescope 10 is generally in line with the sighting object 16, while viewing the sighting object 16 through a collimator (not shown) which is attached to the sighting telescope 10. In the second step, the surveyor depresses the AF start switch 44 to perform the aforementioned autofocus operation to move the focusing lens 18 to an in-focus position (in-focus state) thereof relative to the sighting object 16. In the third step, in a state where the sighting telescope 10 is in focus relative to the sighting object 16, the surveyor adjusts the direction of the sighting telescope 10 so that the reticle (cross hair) 15 viewed through the eyepiece 14 is precisely centered on the sighting object 16 while looking into the eyepiece 14. The measuring light emitted from the light-emitting element 23 of the optical distance meter 20 can be projected toward the sighting object 16 to be incident precisely on the sighting object 16 by making the reticle 15 precisely centered on the sighting object 16. In the fourth step, the surveyor depresses the distance-measurement operation start switch 45 to perform the aforementioned distance-calculating operation, wherein the calculated distance is indicated on the indicating device 42.

In the above described embodiment of the electronic distance meter, since the measuring light reflected by the sighting object 16 selectively enters at the incident end surface of one of the first, second and third light-receiving optical fibers 26m, 26n and 26f which corresponds to the distance from the electronic distance meter to the sighting object 16, a sufficient amount of the measuring light reflected by the sighting object 16 is incident on the light-receiving element 31 regardless of whether the sighting object 16 is positioned at a short distance or a long distance. This prevents the precision in measuring the object distance from deteriorating. The light transmitting/receiving mirror 21 and the light receiving optical fiber bundle 26 (the fiber holder 27) of the optical distance meter 20 are positioned so as not to interfere with the two pupil areas 11A and 11B, and accordingly, do not have any adverse effect on the AF sensor unit 50 that uses the light bundles which are passed through the two pupil areas 11A and 11B, thereby ensuring an accurate autofocus operation. In the above illustrated first embodiment of the electronic distance meter, although the present invention is applied to a surveying instrument (electronic distance meter) equipped with an autofocus system, the present invention can also be applied to a surveying instrument which is not equipped with any autofocus system.

FIGS. 6 through 12B show the second embodiment of the electronic distance meter (EDM) equipped with an autofocus system, according to the present invention. The second embodiment of the electronic distance meter is substantially the same as the first embodiment of the electronic distance meter except that a sector-shaped light shield mask 70 with a plurality of apertures (70a, 70b and 70c) having different diameters is disposed immediately below the incident end surface 26a of the light-receiving optical fiber bundle 26 between the incident end surface 26a and the light receiving mirror 21b, and that the electronic distance meter is provided with a control circuit 80 which controls the operation (position) of the light shield mask 70, wherein the control circuit 80 constitutes a mask position detector. Parts or elements of the second embodiment which are identical to those of the first embodiment are designated by the same reference numerals, and accordingly will not be hereinafter described in detail.

Figures 9A, 9B, 9C:
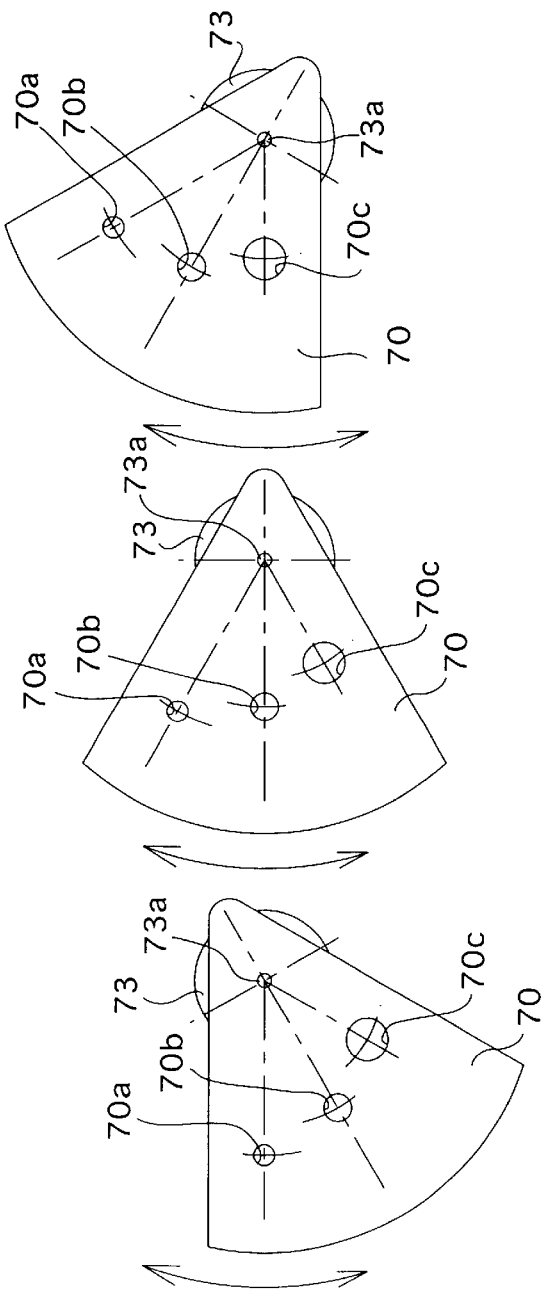
FIG. 9A is a bottom view of the peripheral elements of the incident end of the light-receiving optical fiber bundle shown in FIG. 8A.
FIG. 9B is a bottom view of the peripheral elements of the incident end of the light-receiving optical fiber bundle shown in FIG. 8B.
FIG. 9C is a bottom view of the peripheral elements of the incident end of the light-receiving optical fiber bundle shown in FIG. 8C.

As shown in FIGS. 9A, 9B and 9C, the light shield mask 70 is fixed to a drive shaft 73a of a motor (moving device) 73, and has a sector shape whose center is coincident with the axis of the drive shaft 73a. The light shield mask 70 is provided with three apertures, i.e., a small aperture 70a, a middle aperture 70b and a large aperture 70c at different distances from the shaft 73a. The diameter of the small aperture 70a is smaller than that of the middle aperture 70b, while the diameter of the middle aperture 70b is smaller than that of the large aperture 70c. As shown in FIGS. 8A, 8B and 8C, the small aperture 70a, the middle aperture 70b and the large aperture 70c are positioned immediately below the incident end faces of the third, first and second light-receiving optical fibers 26f, 26m and 26n, respectively, by a forward or reverse rotational movement of the drive shaft 73a of the motor 73. The motor 73 is provided therein with a sensor (not shown) for determining which aperture 70a, 70b or 70c is currently positioned immediately below the incident end face of which light-receiving optical fiber 26m, 26n or 26f. It should be noted that the diameters of the first, second and third light-receiving optical fibers 26m, 26n or 26f are identical to one another in the second embodiment of the electronic distance meter, though the diameter of each of the first and second light-receiving optical fibers 26m and 26n is smaller than that of the third light-receiving optical fiber 26f in the first embodiment of the electronic distance meter.

As can be seen in FIGS. 8A, 8B, 8C, 9A, 9B and 9C, the light shield mask 70 is positioned in a long-distance position A shown in FIGS. 8A and 9A, a first short-distance position B shown in FIGS. 8B and 9B, and a second short-distance position C shown in FIGS. 8C and 9C when the sighting object 16 is located at the aforementioned long distance, the aforementioned first short-distance and the aforementioned second short-distance, respectively. When the light shield mask 70 is positioned in the long-distance position A shown in FIGS. 8A and 9A, the small aperture 70a is positioned immediately below the incident end surface of the third light-receiving optical fiber 26f so that the measuring light reflected by the light-receiving mirror 21b is incident on only the incident end surface of the third light-receiving optical fiber 26f. When the light shield mask 70 is positioned in the first short-distance position B shown in FIGS. 8B and 9B, the middle aperture 70b is positioned immediately below the incident end surface of the first light-receiving optical fiber 26m so that the measuring light reflected by the light-receiving mirror 21b is incident on only the incident end surface of the first light-receiving optical fiber 26m. When the light shield mask 70 is positioned in the second short-distance position C shown in FIGS. 8C and 9C, the large aperture 70c is positioned immediately below the incident end surface of the second light-receiving optical fiber 26n so that the measuring light reflected by the light-receiving mirror 21b is incident on only the incident end surface of the second light-receiving optical fiber 26n. Accordingly, light having an adverse effect on the distance measurement such as direct or reflected sunlight can be prevented from being incident on each of the first, second and third light-receiving optical fibers 26m, 26n and 26f by varying the rotational position of the light shield mask 70 in accordance with the calculated distance. In the second embodiment of the electronic distance meter, since light having an adverse effect on the distance measurement such as direct or reflected sunlight is cut off by the light shield mask 70 in accordance with the calculated distance, no problem occurs even if the diameters of the first, second and third light-receiving optical fibers 26m, 26n and 26f are the same. This is effective especially for a sighting object having an extremely low reflectivity, wherein the light rays reflected therefrom are scarce even at a short distance range.

In the second embodiment of the electronic distance meter, as shown in FIG. 12B, the exit end portions of the first, second and third light-receiving optical fibers 26m, 26n and 26f are closely tied in a bundle in such a manner that all the central axes of the exit end surfaces of the first, second and third light-receiving optical fibers 26m, 26n and 26f are positioned on a circle g about an axis Os of the light-receiving element 31. It is known in the art that the sensitivity of a light-receiving element varies in accordance with the variation of the incident point of the incident light on the light-receiving element. With the arrangement shown in FIG. 12B, since the measuring light is incident on the light-receiving element 31 at an incident point the same distance from the axis Os of the light-receiving element 31 regardless of which of the first, second and third light-receiving optical fiber 26m, 26n and 26f leads the measuring light, reflected by the light receiving mirror 21b, to the light-receiving element 31, the variation of the sensitivity of the light-receiving element 31 due to the variation of the incident point of the measuring light incident on the light-receiving element 31 is minimized.

Figure 6:
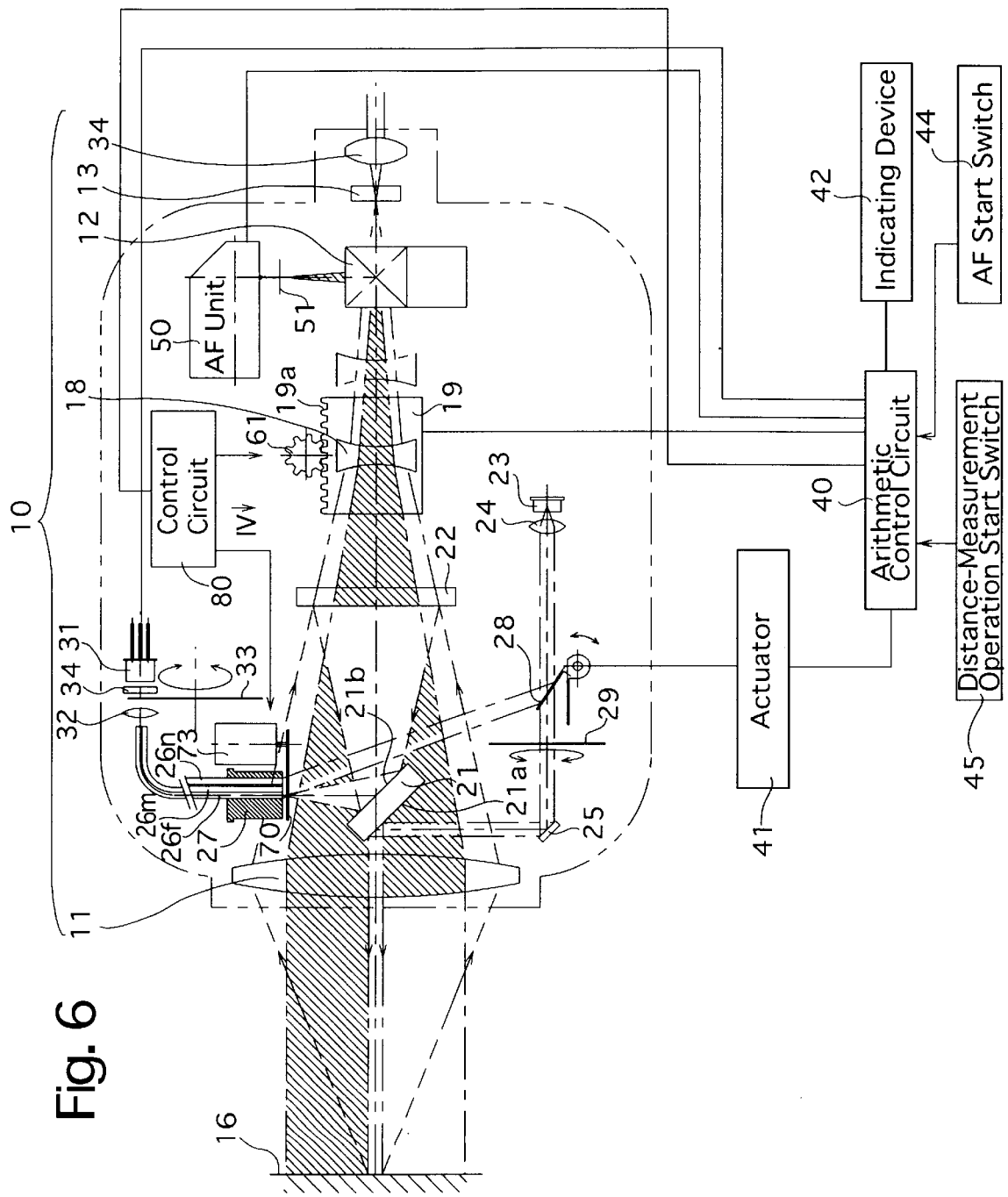
FIG. 6 is a view similar to that of FIG. 1 and illustrates the second embodiment of the electronic distance meter equipped with an autofocus system, according to the present invention.

As shown in FIG. 6, the focusing lens 18 is supported by a lens frame 19. The lens frame 19 is guided in a direction of the optical axis of the sighting telescope 10, and is provided with a rack 19a which extends in the optical axis direction. The electronic distance meter is provided therein with an AF motor (autofocus mechanism) 60 (see FIG. 7). A pinion 61 which is in mesh with the rack 19a is fixed to a rotary drive shaft of the AF motor 60. With this structure, driving the AF motor 60 causes the focusing lens 18 to move, which is supported by the lens frame 19, in the optical axis direction. As shown in FIG. 7, the electronic distance meter has an encoder (angle sensor/lens position detection device) 62 provided in association with the AF motor 60. In the illustrated embodiment, the encoder 62 is an optical encoder which includes a rotary disc 62a having a plurality of radial slits (not shown) and a photo-sensor 62b having a light emitter and a light receiver which are positioned on the opposite sides of the rotary disc 62a. The encoder 62 outputs a pulse signal which corresponds to the amount of rotation (angle of rotation) of the AF motor 60 to the control circuit 80.

Figure 10:
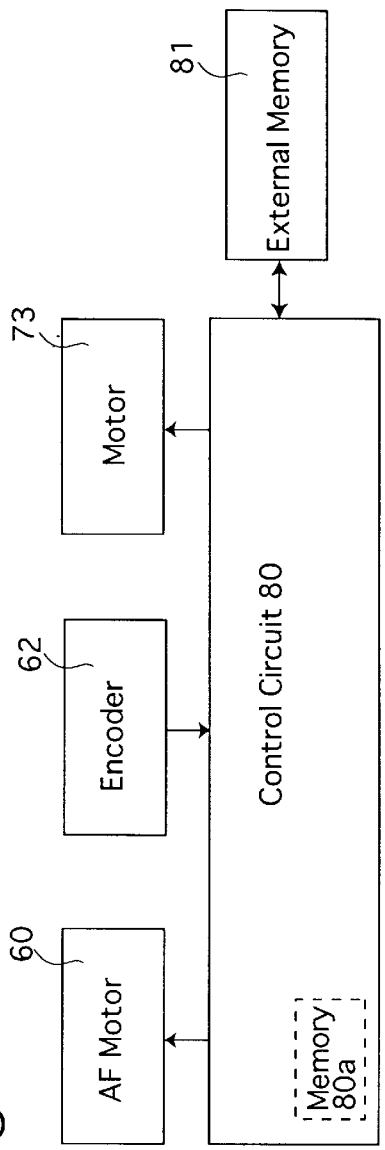
FIG. 10 is a block diagram of a control system for controlling the second embodiment of the electronic distance meter shown in FIG. 6.

FIG. 10 is a block diagram of a control system including the AF motor 60, the encoder 62, the motor 73, the control circuit (controller) 80 and an external memory (e.g., an EEPROM) 81. This control system is controlled by the control circuit 80. Upon inputting a drive commencement signal from the arithmetic control circuit 40, the control circuit 80 drives the AF motor 60 in accordance with the pulse signal input from the encoder 62. The AF motor 60 stops immediately after the number of pulses of the pulse signal output from the encoder 62 reaches the number of pulses which corresponds to the amount of defocus calculated by the arithmetic control circuit 40. The number of pulses of the pulse signal output from the encoder 62 is stored in a memory 80a provided within the control circuit 80. In the external memory 81, information for determining whether the axial position of the focusing lens 18 which corresponds to the detected amount of rotation (angle of rotation) of the motor 60, which is detected with the encoder 62, is in a first short-distance range (first short-distance in-focus range), a second short-distance range (second short-distance in-focus range) or a long distance range (long-distance in-focus range) is stored. The aforementioned first short-distance, the aforementioned second short distance and the aforementioned long distance are included in the first short-distance range, the second short-distance range and the long distance range, respectively. Each of the first short-distance range (first short-distance in-focus range) and the second short-distance range (second short-distance in-focus range) is determined as a distance range in which a majority of the measuring light which is reflected by the sighting object 16 and passed through the objective lens 11 is interrupted by the light transmitting/receiving mirror 21 to the extent where the amount of light of the measuring light incident upon the incident end surface 26a of the light receiving optical fiber 26 becomes insufficient to perform the distance measuring operation when the light shield mask 70 is positioned in the long distance position A shown in FIGS. 8A and 9A. The limit of the first short-distance range (first short-distance in-focus range) which corresponds to the border between the first short-distance range and the long distance range can be determined by changing, e.g., the size of the light transmitting/receiving mirror 21 and the diameter of the light receiving optical fiber 26. Likewise, the limit of the second short-distance range (second short-distance in-focus range) which corresponds to the border between the first short-distance range and the second short-distance range can also be determined by changing, e.g., the size of the light transmitting/receiving mirror 21 and the diameter of the light receiving optical fiber 26. The motor 73 for moving the light shield mask 70 is connected to the control circuit 80.

Figure 11:
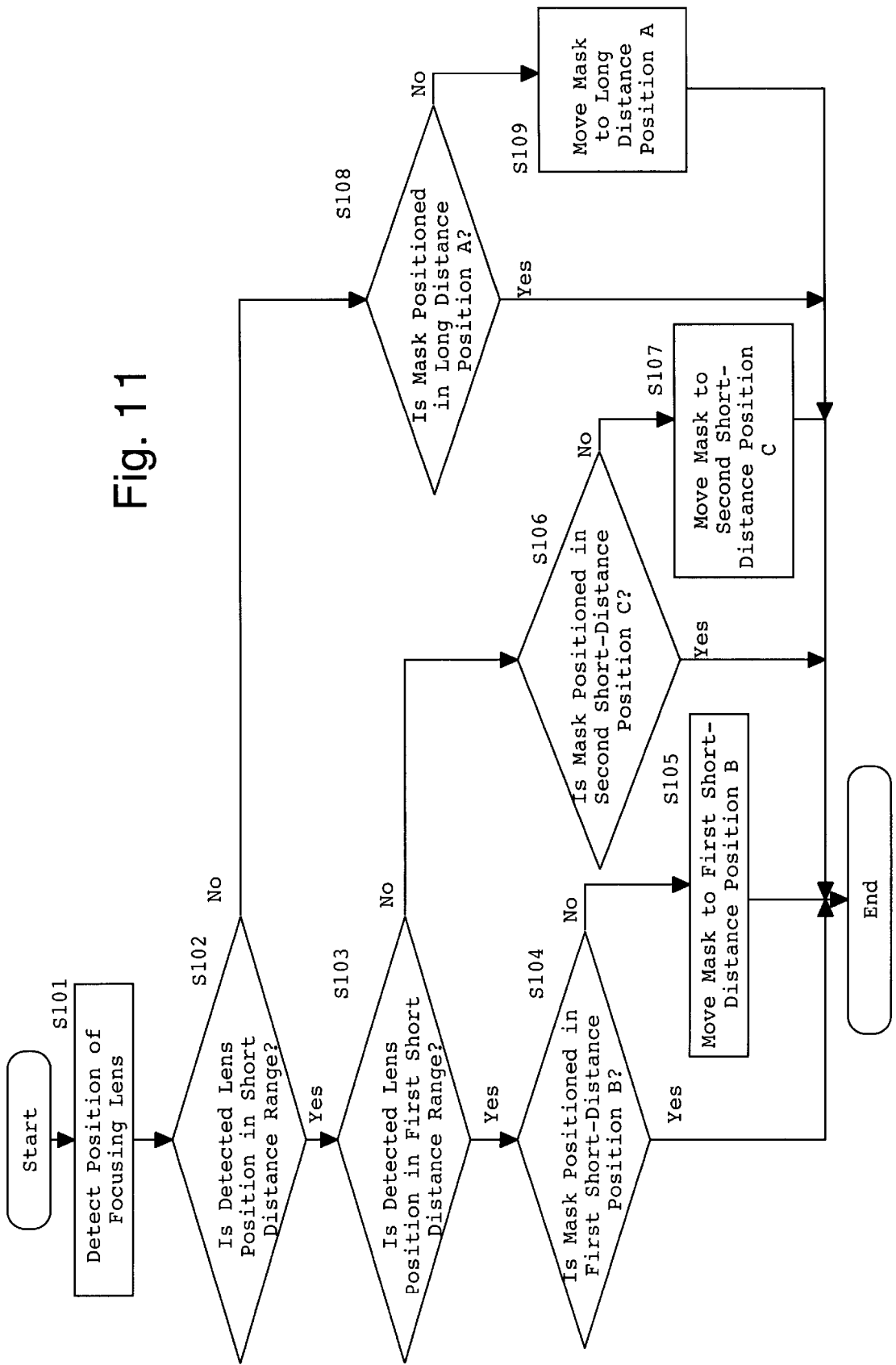
FIG. 11 is a flow chart showing a light-shield-mask driving process which is performed by the control circuit shown in FIG. 10.

FIG. 11 shows a light-shield-mask driving process for driving the light shield mask 70 when the distance-measurement operation start switch 45 is turned ON. The light-shield-mask driving process is performed by the control circuit 80. Firstly, the axial position of the focusing lens 18 is detected in accordance with the number of pulses stored in the memory 80a (step S101). Subsequently, it is determined whether the detected position of the focusing lens 18 is in a predetermined short distance range including the aforementioned first and second short-distance ranges with reference to the information stored in the external memory 81 (step S102). If it is determined that the detected position of the focusing lens 18 is in the short distance range including the first and second short-distance ranges (if "Yes" at step S102), it is determined whether the detected position of the focusing lens 18 is in the first short-distance range (step S103). If it is determined that the detected position of the focusing lens 18 is in the first short distance range (if "Yes" at step S103), it is determined whether the light shield mask 70 is positioned in the first short-distance position B shown in FIGS. 8B and 9B (step S104). The rotational position of the light shield mask 70 is sensed by the aforementioned sensor (not shown) provided in the motor 73. If it is determined at step S104 that the light shield mask 70 is not positioned in the first short-distance position B (if "No" at step S104), the motor 73 is actuated to rotate the light shield mask 70 so that it is positioned in the first short-distance position B (step S105), and control ends. If it is determined at step S104 that the light shield mask 70 is positioned in the first short-distance position B (if "Yes" at step S104), control ends. If it is determined at step S103 that the detected position of the focusing lens 18 is not in the first short-distance range (if "No" at step S103), it is determined whether the light shield mask 70 is positioned in the second short-distance position C shown in FIGS. 8C and 9C (step S106). If it is determined at step S106 that the light shield mask 70 is not positioned in the second short-distance position C (if "No" at step S106), the motor 73 is actuated to rotate the light shield mask 70 so that it is positioned in the second short-distance position C (step S107), and control ends. If it is determined at step S106 that the light shield mask 70 is positioned in the second short-distance position C (if "Yes" at step S106), control ends. If it is determined at step S102 that the detected position of the focusing lens 18 is not in either the first short-distance range or the second short-distance ranges (if "No" at step S102), it is determined whether the light shield mask 70 is positioned in the long distance position A shown in FIGS. 8A and 9A (step S108).

If it is determined at step S108 that the light shield mask 70 is not positioned in the long distance position A (if "No" at step S108), the motor 73 is actuated to rotate the light shield mask 70 so that it is positioned in the long distance position A (step S109), and control ends. If it is determined at step S108 that the light shield mask 70 is positioned in the long distance position A (if "Yes" at step S108), control ends.

According to the above-described light-shield-mask driving process, the light shield mask 70 is positioned in the long-distance position A shown in FIGS. 8A and 9A, the first short-distance position B shown in FIGS. 8B and 9B, and the second short-distance position C shown in FIGS. 8C and 9C when the axial position of the focusing lens 18 is in the long distance range, the first short-distance range and the second short-distance range, respectively. Therefore, the light shield mask 70 is positioned in accordance with the axial position of the focusing lens 18 positioned at an in-focus position thereof, i.e., in accordance with the calculated distance.

Namely, an appropriate light-receiving optical fiber for making the measuring light incident on the light-receiving element 31 can be selected from the first through third light-receiving optical fibers 26m, 26n and 26f in accordance with the distance from the electronic distance meter to the sighting object 16.

In the second embodiment of the electronic distance meter, although the exit end portions of the first, second and third light-receiving optical fibers 26m, 26n and 26f are closely tied so that all the exit end surfaces of the first, second and third light-receiving optical fibers 26m, 26n and 26f are positioned on a circle g about the axis Os of the light-receiving element 31 as shown in FIG. 12B for the purpose of minimizing the variation of the sensitivity of the light-receiving element 31 due to the variation of the incident point of the incident light on the light-receiving element, condenser lens 32'f, 32'm and 32'n, band-pass filters 34'f, 34'm and 34'n, and light-receiving elements 31'f, 31'm and 31'n can be positioned for the light-receiving optical fiber 26f, 26m and 26n as shown in FIG. 13, respectively.

In the second embodiment of the electronic distance meter, the diameters of the first, second and third light-receiving optical fibers 26m, 26n or 26f are identical to one another. However, in an alternative, the diameters of the optical fibers can be made different from each other, e.g., in a manner similar to the first embodiment of the electronic distance meter so that the diameters of the fibers correspond to the diameters of the plurality of apertures 70a, 70b and 70c.

The number of the light-receiving optical fibers is three in each of the first and second embodiments of the electronic distance meter, but can be constructed as two or more than three.

In the second embodiment of the electronic distance meter, an appropriate light-receiving optical fiber for making the measuring light incident on the light-receiving element 31 is selected from the first through third light-receiving optical fibers 26m, 26n and 26f in accordance with the detected axial position of the focusing lens 18, the present invention is not limited solely to this particular embodiment. For instance, a light-receiving optical fiber via which the light-receiving element 31 receives the measuring light whose light amount is greatest can be selected from the first through third light-receiving optical fibers 26m, 26n and 26f as shown in a light-shield-mask driving process in FIG. 14. Alternatively, a light-receiving optical fiber can be selected from the first through third light-receiving optical fibers 26m, 26n and 26f in accordance with the amount of the measuring light received by the light-receiving element 31 as shown in a light-shield-mask driving process in FIG. 15.

The light-shield-mask driving process shown in FIG. 14 is performed by the control circuit 80. Firstly, upon the distance-measurement operation start switch 45 being turned ON, the motor 73 is actuated to rotate the light shield mask 70 so that it is positioned in the long distance position A (step S201). Subsequently, the light-emitting element 23 is driven to emit measuring light (step S202), and at the same time, the amount of measuring light (a light amount A) is stored in a light-amount storing memory (e.g., the memory 80a) provided in the control circuit 80 (step S203). Subsequently, the motor 73 is actuated to rotate the light shield mask 70 so that it is positioned in the first short-distance position B (step S204). Subsequently, the light-emitting element 23 is driven to emit measuring light (step S205), and at the same time, the amount of measuring light (a light amount B) is stored in the light-amount storing memory (step S206). Subsequently, the motor 73 is actuated to rotate the light shield mask 70 so that it is positioned in the second short-distance position C (step S207). Subsequently, the light-emitting element 23 is driven to emit measuring light (step S208), and at the same time, the amount of measuring light (a light amount C) is stored in the light-amount storing memory (step S209).

Subsequently, it is determined whether each of the aforementioned light amounts A, B and C is greater than a predetermined light amount (step S210). If none of the light amounts A, B and C is greater than the predetermined light amount (if "No" at step S210), a message or symbol for visually informing that the sighting object is located farther than the maximum measurable distance (i.e., for visually informing that it is impossible to perform the distance measuring operation due to the amount of measuring light incident on the light-receiving element 31 being insufficient) is indicated on the indicating device 42 (step S211), and thereafter control ends. On the other hand, if it is determined at step S210 that at least one of the light amounts A, B and C is greater than the predetermined light amount (if "Yes" at step S210), the light amounts A, B and C are compared with each other to determine which light amount A, B or C is the greatest (step S212). Subsequently, the motor 73 is actuated to rotate the light shield mask 70 so that it is positioned in one of the three distance positions (i.e., the long distance position A, the first short-distance position B and the second short-distance position C) in which the greatest light amount is obtained (step S213). For instance, if the light amount A is greatest among the three light amounts A, B and C, the light shield mask 70 is rotated to be positioned in the long distance position A, so that the distance measuring operation is performed with the third light-receiving optical fiber 26f. Subsequently, the distance measuring operation is performed (step S214), and control ends.

Figure 15A:
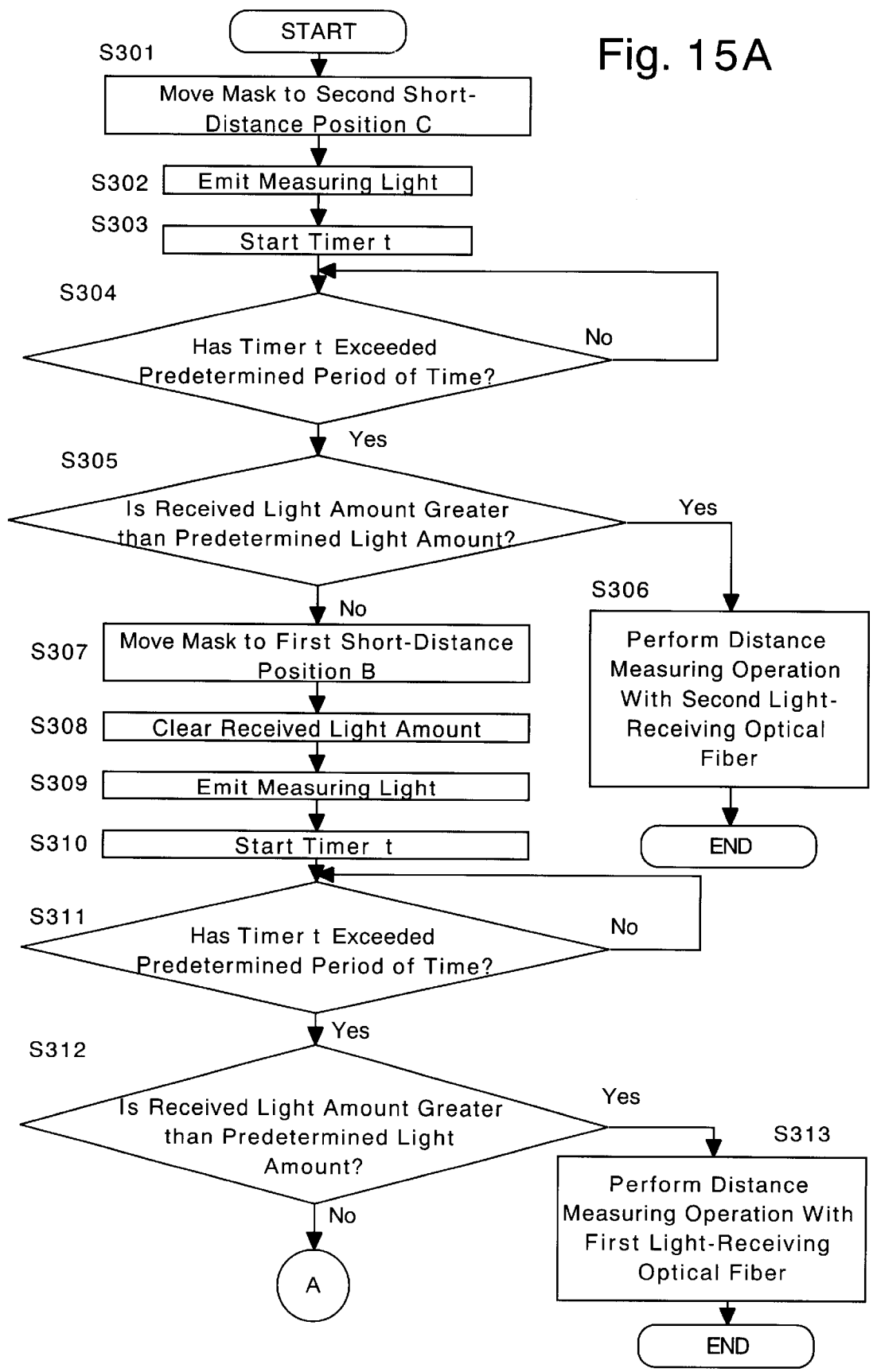
FIGS. 15A and 15B are a flow chart showing another embodiment of the light-shield-mask driving process that is performed by the control circuit shown in FIG. 10.
Figure 15B:
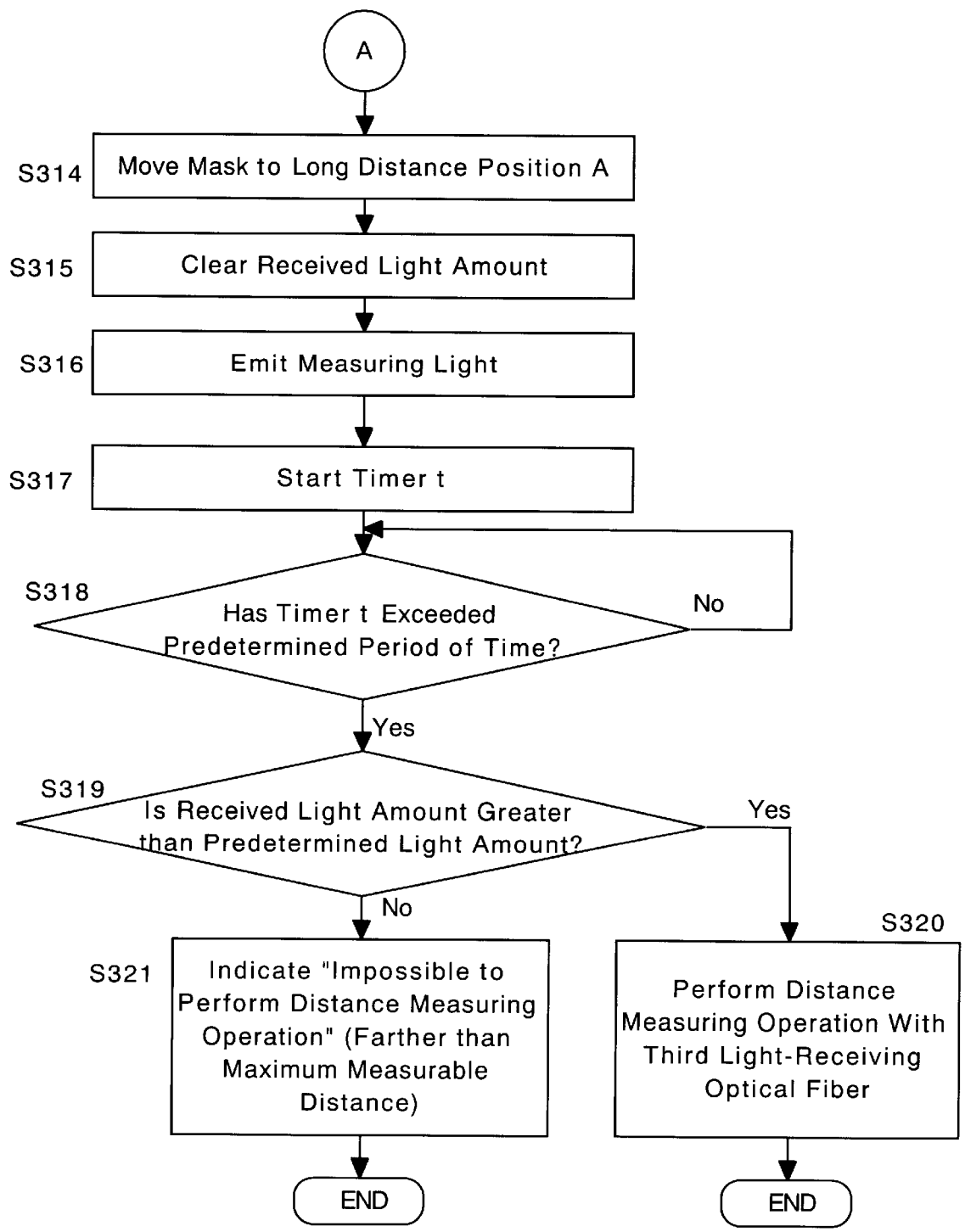

The light-shield-mask driving process shown in FIG. 15 is performed by the control circuit 80. Firstly, upon the distance-measurement operation start switch 45 being turned ON, the motor 73 is actuated to rotate the light shield mask 70 so that it is positioned in the second distance position C (step S301). Subsequently, the light-emitting element 23 is driven to emit the measuring light (step S302), a timer t is started (step S303), and it is determined whether the timer t has exceeded a predetermined period of time (step S304). If it is determined at step S304 that the timer t has not yet exceeded the predetermined period of time (if "No" at step S304), control repeats step S304. If it is determined at step S304 that the timer t has exceeded the predetermined period of time (if "Yes" at step S304), it is determined whether the light amount received by the light-receiving element 31 is greater than a predetermined light amount (step S305). If the light amount is greater than the predetermined light amount (if "Yes" at step S305), control proceeds to step S306 to perform the distance measuring operation with the second light-receiving optical fiber 26n. If the light amount is equal to or smaller than the predetermined light amount (if "No" at step S305), the motor 73 is actuated to rotate the light shield mask 70 so that it is positioned in the first short-distance position B (step S307), and subsequently the light amount of the light-receiving element 31 is cleared (step S308). Subsequently, the light-emitting element 23 is driven to emit the measuring light (step S309), the timer t is again started (step S310), and it is determined whether the timer t has exceeded a predetermined period of time (step S311). If it is determined at step S311 that the timer A has not yet exceeded the predetermined period of time (if/"No" at step S311), control repeats step S311. If it is determined at step S311 that the timer t has exceeded the predetermined period of time (if "Yes" at step S311), it is determined whether the light amount received by the light-receiving element 31 is greater than the aforementioned predetermined light amount (step S312). If the light amount is greater than the predetermined light amount (if "Yes" at step S312), control proceeds to step S313 to perform the distance measuring operation with the first light-receiving optical fiber 26m. If the light amount is equal to or smaller than the predetermined light amount (if "No" at step S312), the motor 73 is actuated to rotate the light shield mask 70 so that it is positioned in the long distance position A (step S314), and subsequently the light amount of the light-receiving element 31 is cleared (step S315). Subsequently, the light-emitting element 23 is driven to emit the measuring light (step S316), the timer t is again started (step S317), and it is determined whether the timer t has exceeded the predetermined period of time (step S318). If it is determined at step S318 that the timer t has not yet exceeded the predetermined period of time (if "No" at step S318), control repeats step S318. If it is determined at step S318 that the timer t has exceeded the predetermined period of time (if "Yes" at step S318), it is determined whether the light amount received by the light-receiving element 31 is greater than the aforementioned predetermined light amount (step S319). If the light amount is greater than the predetermined light amount (if "Yes") at step S319), control proceeds to step S320 to perform the distance measuring operation with the third light-receiving optical fiber 26f, and thereafter control ends. If the light amount is equal to or smaller than the predetermined light amount (if "No" at step S319), a message or symbol for informing that the sighting object is located farther than the maximum measurable distance (i.e., for visually informing that it is impossible to perform the distance measuring operation due to an insufficient amount of the measuring light incident on the light-receiving element 31) is indicated on the indicating device 42 (step S321), and control ends.

Although the above described second embodiment is an example of a surveying instrument equipped with an autofocus system to which the present invention is applied, the present invention can also be applied to a surveying instrument equipped with a manual focus system. Namely, the aforementioned objects of the present invention are achieved in the second embodiment regardless of whether an autofocus system is provided. Furthermore, the light shield mask 70 can be manually rotated to be positioned at the long distance position A, the first short-distance position B or the second short-distance position C. In this case it can be determined at which of the three positions A, B and C the light shield mask 70 is to be positioned by firstly detecting the axial position of the focusing lens 18 after it is manually adjusted, and subsequently determining whether the distance which corresponds to the detected axial position of the focusing lens 18 is in the first short-distance range, the second short-distance range or the long distance range.

FIGS. 16A through 20 show the third embodiment of the electronic distance meter (EDM) equipped with an autofocus system, according to the present invention. The third embodiment of the electronic distance meter is substantially the same as the first embodiment of the electronic distance meter except that a single light-receiving optical fiber (light-guiding optical system) 260 having a large diameter is used in the second embodiment instead of a light-receiving optical fiber bundle consisting of more than one light-receiving optical fiber, and that a circular light shield mask 72 with a plurality of apertures (72a and 72b) having different diameters is disposed immediately below an incident end surface 260a of the light-receiving optical fiber bundle 260. The light-receiving optical fiber 260 having a large diameter, which corresponds to the light-receiving optical fiber bundle 26 of each of the first and second embodiments, is used so that the incident end surface 260a can securely receive the measuring light which is incident on the incident end surface 260a at a position thereon which deviates from the center thereof when the sighting object 16 is located at a short distance. Parts or elements of the second embodiment which are identical to those of the first embodiment are designated by the same reference numerals, and accordingly will not be hereinafter described in detail.

Figure 16A:
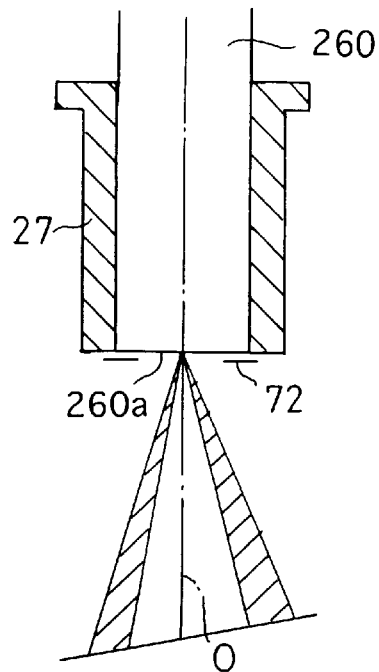
FIG. 16A is an enlarged side elevational view of an incident end of a light-receiving optical fiber and peripheral elements thereof in the third embodiment of the electronic distance meter, showing a state of the measuring light incident on the incident end surface of the light-receiving optical fiber when the electronic distance meter measures the distance to a sighting object located at a long distance.
Figure 16B:
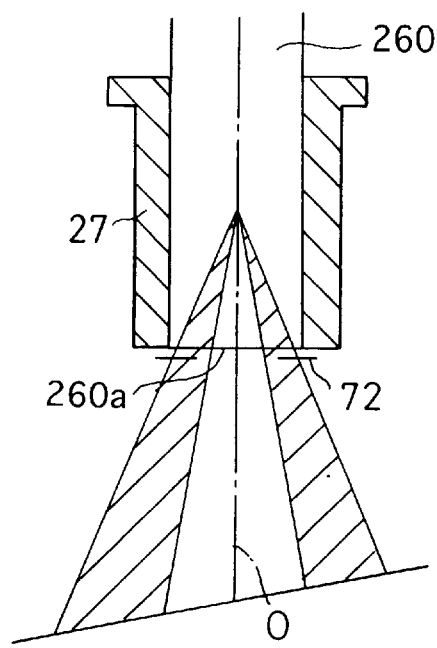
FIG. 16B is a view similar to that of FIG. 16A and shows another state of the measuring light incident on the incident end surface of the light-receiving optical fiber when the electronic distance meter measures the distance to a sighting object located at a first short distance.
Figure 16C:
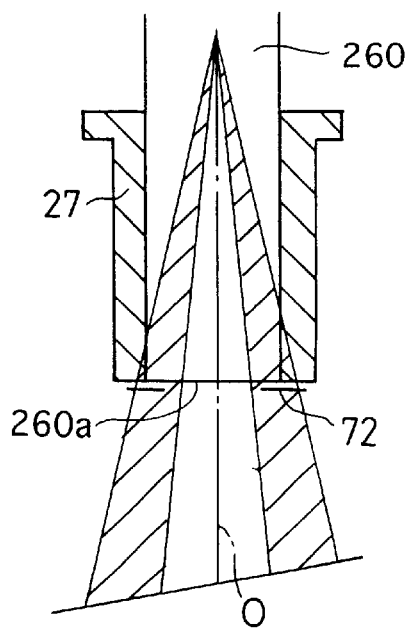
FIG. 16C is a view similar to that of FIG. 16A and shows another state of the measuring light incident on the incident end surface of the light-receiving optical fiber when the electronic distance meter measures the distance to a sighting object located at a second short distance.

FIG. 16A shows a state of the measuring light (indicated by hatched areas) incident on the incident end surface 260a of the light-receiving optical fiber 260 when the electronic distance meter measures the distance therefrom to the sighting object 16 located at the aforementioned long distance. FIG. 16B shows another state of the measuring light (indicated by hatched areas) incident on the incident end surface 260a of the light-receiving optical fiber 260 when the electronic distance meter measures the distance to the sighting object 16 located at the aforementioned first short distance. FIG. 16C shows yet another state of the measuring light (indicated by hatched areas) incident on the incident end surface 260a of the light-receiving optical fiber 260 when the electronic distance meter measures the distance to the sighting object 16 located at the aforementioned second short distance. As can be seen in FIGS. 16A, 16B and 16C, since the diameter of the light-receiving optical fiber 260 is great, the measuring light can enter into the light-receiving optical fiber 260 from the incident end surface 260a thereof regardless of the distance from the electronic distance meter to the sighting object 16. The circular light shield mask 72 is disposed immediately below the incident end surface 260a so as to entirely cover the circular incident end surface 260a for adjusting the amount of the measuring light incident on the incident end surface 260a in accordance with the distance from the electronic distance meter to the sighting object 16.

Figure 17:
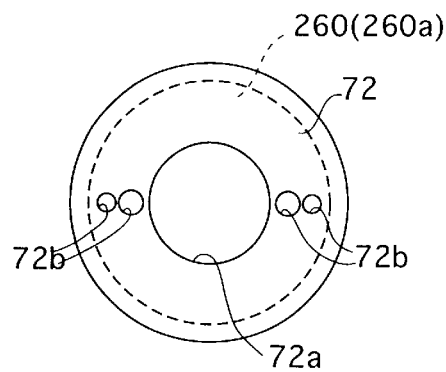
FIG. 17 is a bottom plan view of the first embodiment of a light shield mask shown in FIGS. 16A, 16B and 16C.
Figure 18:
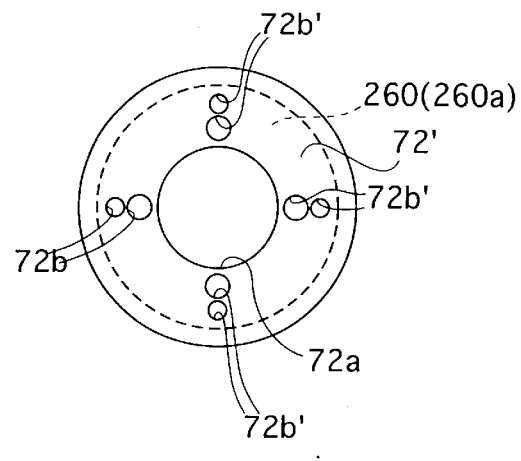
FIG. 18 is a bottom plan view of the second embodiment of the light shield mask shown in FIGS. 16A, 16B and 16C.

As shown in FIG. 17, the circular light shield mask 72 is provided with a central large aperture 72a via which a central portion of the incident end surface 260a is exposed with respect to the light receiving mirror 21b of the light transmitting/receiving mirror 21. The circular light shield mask 72 is further provided on each of opposite sides of the central large aperture 72a with two side apertures (inner and outer side apertures) 72b having different diameters. The diameter of the inner side aperture 72b that is positioned closer to the central large aperture 72a is greater than that of the outer side aperture 72b. The measuring light reflected by the light receiving mirror 21b is incident on the incident end surface 260a via the central large aperture 72a when the sighting object 16 is located at the long distance, while the measuring light reflected by the light receiving mirror 21b is incident on the incident end surface 260a via the inner and outer side apertures 72b when the sighting object 16 is located at the first short distance and the second short distance, respectively. Each of the inner and outer side apertures 72b is formed smaller than the central large aperture 72a to prevent a great amount of light having an adverse effect on the distance measurement such as direct or reflected sunlight from being incident on the incident end surface 260a. When the electronic distance meter measures the distance therefrom to the sighting object 16 located at a short distance, no problem arises even with the side apertures 72b each having a small diameter since a sufficient amount of the measuring light is incident on the incident end surface 260a of the light-receiving optical fiber bundle 260. Alternatively, FIG. 18 shows a circular light shield mask 72' having four pairs of side apertures 72b' at equi-angular intervals, i.e., at intervals of 90 degrees. The circular light shield mask 72' having this structure increases the amount of the measuring light incident on the incident end surface 260a when the electronic distance meter measures the distance therefrom to the sighting object 16 located at a short distance.

Figure 19A:
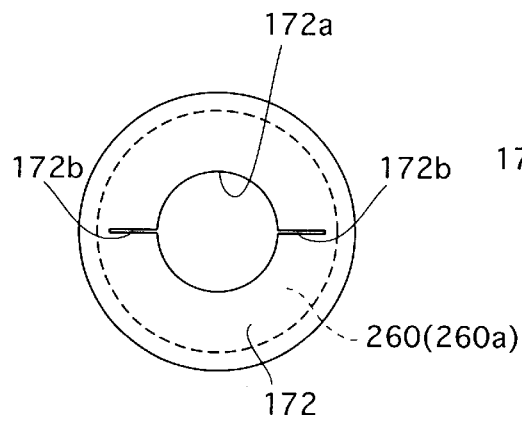
FIG. 19A is a bottom plan view of the third embodiment of the light shield mask shown in FIGS. 16A, 16B and 16C.

FIG. 19A shows a circular light shield mask 172 which is another embodiment of the circular light shield mask 72. In this embodiment, the circular light shield mask 172 is provided with the central large aperture 172a, and is further provided on opposite sides of a central large aperture 172a with two radial slits 172b. The inner end of each slit 172b is in communicative connection with the central large aperture 172a. With this circular light shield mask 172, similar effects can be expected as in the circular light shield mask 72.

Figure 19B:
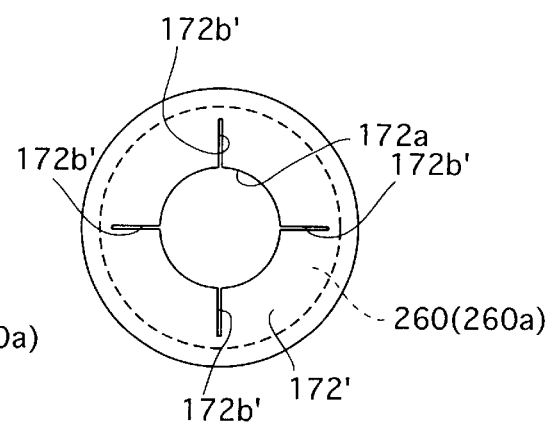
FIG. 19B is a bottom plan view of the fourth embodiment of the light shield mask shown in FIGS. 16A, 16B and 16C.

FIG. 19B shows a circular light shield mask 172' which is another embodiment of the circular light shield mask 172. In this embodiment, the circular light shield mask 172' is provided with a central large aperture 172a', and is further provided at equi-angular intervals around the central large aperture 172a' with four radial slits 172b'. With this circular light shield mask 172', similar effects can also be expected as in the circular light shield mask 72.

Figure 20A:
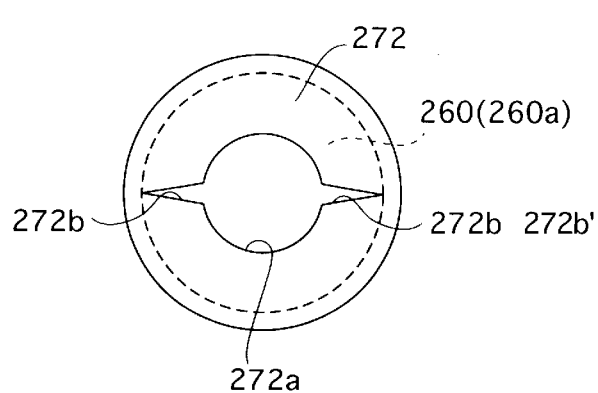
FIG. 20A is a bottom plan view of the fifth embodiment of the light shield mask shown in FIGS. 16A, 16B and 16C.
Figure 20B:
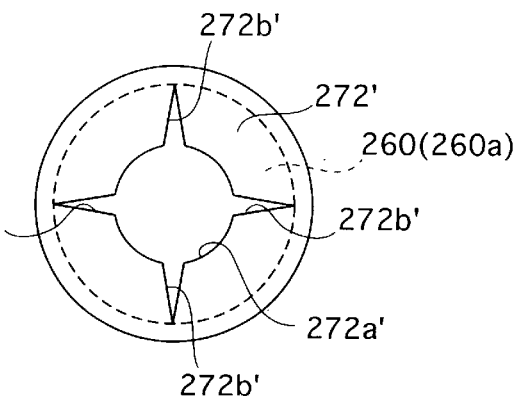
FIG. 20B is a bottom plan view of the sixth embodiment of the light shield mask shown in FIGS. 16A, 16B and 16C.

FIG. 20A shows a circular light shield-mask 272 which is another embodiment of the circular light shield mask 72. In this embodiment, the circular light shield mask 272 is provided with a central large aperture 272a, and is further provided on opposite sides of the central large aperture 272a with two radial wedge-shaped cut-out portions 272b, respectively. The inner end of each cut-out portion 272b is in communicative connection with the central large aperture 272a. The width of each cut-out portion 272b decreases in a direction away from the central large aperture 272a. With this circular light shield mask 272, similar effects can be expected as in the circular light shield mask 72. FIG. 20B shows a circular light shield mask 272' which is another embodiment of the circular light shield mask 72. In this embodiment, the circular light shield mask 272' is provided with the central large aperture 272a', and is further provided at equi-angular intervals around the central large aperture 272a' with four radial wedge-shaped cut-out portions 272b'. With this circular light shield mask 272', similar effects can also be expected as in the circular light shield mask 72. Similar to the above described second embodiment of the electronic distance meter, the aforementioned objects of the present invention are achieved in the third embodiment regardless of whether an autofocus system is provided.

Although the Porro-prism erecting system 12 is used as an erecting optical system and also as a beam splitting optical system for splitting the incident light bundle into two light bundles so that one of the two light bundles proceeds toward the AF sensor unit 50 while the other light bundle proceeds toward the eyepiece 14, any other optical elements can be used instead of the Porro-prism erecting system 12.

Figure 21:
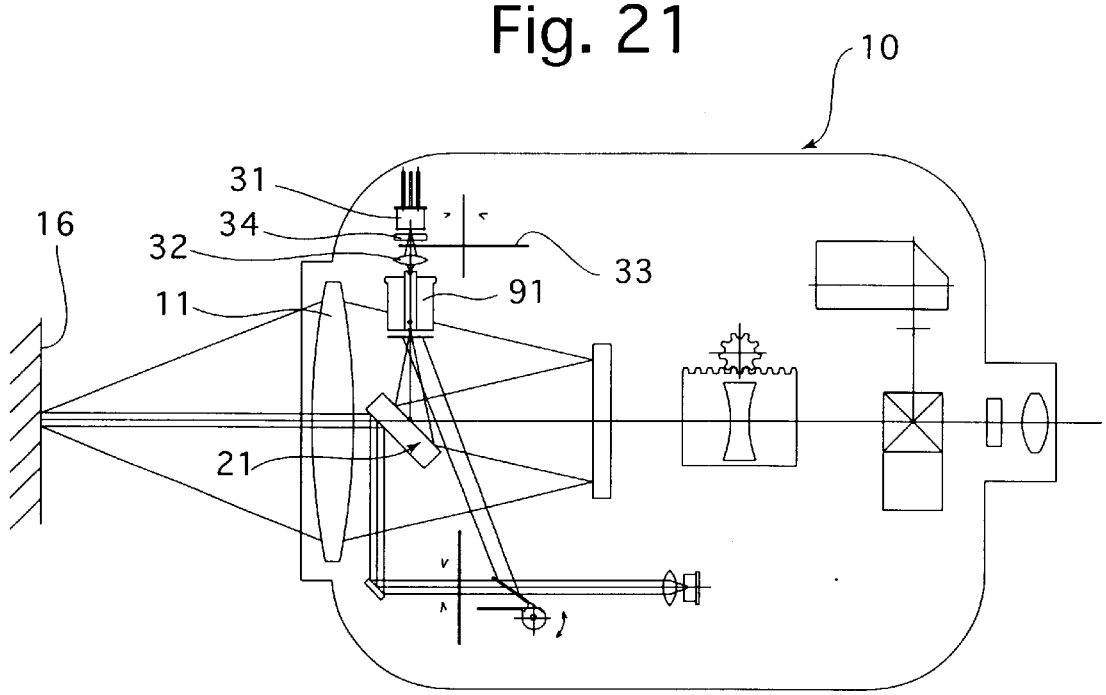
FIG. 21 is a view similar to that of FIG. 1 and illustrates another embodiment of a light-guiding optical system.
Figure 22:
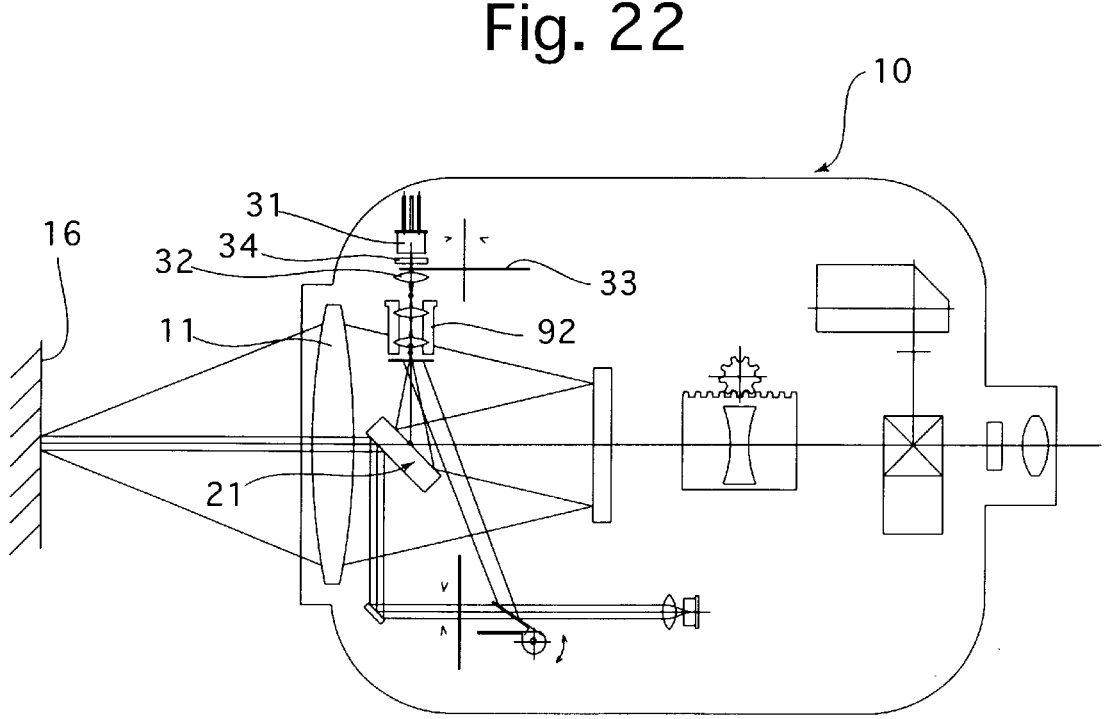
FIG. 22 is a view similar to that of FIG. 1 and illustrates another embodiment of the light-guiding optical system.

In each of the above described embodiments, although each optical fiber of the light-receiving optical fiber bundle 26 and the light-receiving optical fiber 260 are each used as a light-guiding optical system, the present invention is not limited solely to such particular optical fiber or fiber bundle. For instance, the light-receiving optical fiber bundle 26 or the light-receiving optical fiber 260 can be replaced by a SELFOC lens (SELFOC optical fiber) 91 as shown in FIG. 21, or by a relay lens group 92 as shown in FIG. 22, As can be understood from the foregoing, according to a surveying instrument having an optical distance meter to which the present invention is applied, the aforementioned problem of the amount of the measuring light incident on a light receiving element decreasing when a sighting object is located at a short distance, which deteriorates the precision in measuring the object distance wherein the minimum measurable distance becomes long, are overcome in an easy manner without deteriorating the performance characteristics of the distance measuring operation of the optical distance meter when the distance to a target is measured at the maximum measurable distance. Furthermore, according to a surveying instrument having an optical distance meter and a focus detection device for detecting a focus state of a distance-measuring optical system, to which the present invention is applied, the above problems are overcome in an easy manner without deteriorating the performance characteristics of the distance measuring operation of the optical distance meter when measuring the distance to a target at the maximum measurable distance.

In the above illustrated second embodiment of the electronic distance meter, the arithmetic control circuit 40 and the control circuit 80 can be integrated into a single control circuit.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A surveying instrument comprising:
a distance-measuring optical system having an objective lens via which a distance from said surveying instrument to an object is measured; and
an optical distance meter which includes a reflection member positioned behind said objective lens, a light-transmitting optical system for transmitting a measuring light toward said object via said reflection member and said objective lens, and a light-receiving optical system for receiving a portion of said measuring light which is reflected by said object, subsequently passed through said objective lens and not interrupted by said reflection member;
wherein said light-receiving optical system comprises a plurality of light-guiding optical systems, so that said measuring light which is reflected by said object is selectively incident on an end of one of said plurality of light-guiding optical systems in accordance with said distance from said surveying instrument to said object; and
wherein a diameter of at least one light-guiding optical system of said plurality of light-guiding optical systems, to which said measuring light reflected by said object is incident on, is greater as the object distance for which said at least one light-guiding optical system is used is longer.

2. A surveying instrument comprising:
a distance-measuring optical system having an objective lens via which a distance from said surveying instrument to an object is measured; and
an optical distance meter which includes a reflection member positioned behind said objective lens, a light-transmitting optical system for transmitting a measuring light toward said object via said reflection member and said objective lens, and a light-receiving optical system for receiving a portion of said measuring light which is reflected by said object, subsequently passed through said objective lens and not interrupted by said reflection member;

wherein said light-receiving optical system comprises a plurality of light-guiding optical systems, so that said measuring light which is reflected by said object is selectively incident on an end of one of said plurality of light-guiding optical systems in accordance with said distance from said surveying instrument to said object;

further comprising a light shield mask having a plurality of apertures; wherein said measuring light reflected by said object is selectively incident on said end of said one of said plurality of light-guiding optical systems via one of said plurality of apertures.

3. The surveying instrument according to claim 2, wherein diameters of said plurality of apertures are different from one another, said diameters of said plurality of light-guiding optical systems being identical to one another.

4. The surveying instrument according to claim 2, wherein diameters of said plurality of apertures are different form one another, wherein the diameters of said plurality of light-guiding optical systems correspond to the diameters of said plurality of apertures of the light shield mask.

5. The surveying instrument according to claim 2, further comprising a moving device for moving said light shield mask so that said measuring light reflected by said object can be selectively incident on said end of said one of said plurality of light-guiding optical systems.

6. The surveying instrument according to claim 5, wherein said distance-measuring optical system comprises a focus adjustment lens which is moved to bring said object into focus;

said surveying instrument further comprising a lens position detection device which detects an axial position of said focus adjustment lens, said moving device moving said light shield mask in accordance with said axial position of said focus adjustment lens that is detected by said lens position detection device.

7. The surveying instrument according to claim 5, further comprising a controller which controls said moving device to move said light shield mask in accordance with a state of said light-receiving optical system when said light-receiving optical system receives said measuring light reflected by said object.

8. The surveying instrument according to claim 7, wherein said controller comprises a mask position detector for detecting a position of said light shield mask in which an amount of said measuring light reflected by said object and received by said light-receiving optical system becomes maximum; and wherein said controller controls said moving device to move said light shield mask in accordance with said position of said light shield mask that is detected by said ask position detector.

9. The surveying instrument according to claim 7, wherein said controller controls said moving device to move said light shield mask so that said measuring light reflected by said object is incident on an end of another one of said plurality of light-guiding optical systems in the case where an amount of said measuring light reflected by said object and received by said light-receiving optical system via said one of said plurality of light-guiding optical systems, at a predetermined amount of time, is not greater than a predetermined amount of light.

10. The surveying instrument according to claim 1, wherein the central axes of the incident end surfaces of said plurality of light-guiding optical systems are positioned on a straight line.

11. A surveying instrument comprising:

a distance-measuring optical system having an objective lens via which a distance from said surveying instrument to an object is measured; and an optical distance meter which includes a reflection member positioned behind said objective lens, a light-transmitting optical system for transmitting a measuring light toward said object via said reflection member and said objective lens, and a light-receiving optical system for receiving a portion of said measuring light which is reflected by said object, subsequently passed through said objective lens and not interrupted by said reflection member;

wherein said light-receiving optical system comprises a plurality of light-guiding optical systems, so that said measuring light which is reflected by said object is selectively incident on an end of one of said plurality of light-guiding optical systems in accordance with said distance from said surveying instrument to said object;

wherein said light-receiving optical system comprises a light-receiving element on which said measuring light reflected by said object is incident via said plurality of light-guiding optical systems; and wherein the central axes of the exit end surfaces of said plurality of light-guiding optical systems are positioned on a circle about an axis of said light-receiving element.

12. The surveying instrument according to claim 1, wherein said light-receiving optical system comprises a plurality of light-receiving elements on which said measuring light reflected by said object is incident via said plurality of light-guiding optical systems, respectively.

13. The surveying instrument according to claim 1, wherein each of said plurality of light-guiding optical systems comprises an optical fiber.

14. The surveying instrument according to claim 1, wherein said distance-measuring optical system comprises a sighting telescope for sighting said object.

15. The surveying instrument according to claim 1, wherein said reflection member is comprised of a parallel-plate mirror having a front surface and a rear surface which are parallel to each other;

wherein said front surface faces said objective lens and is formed as a light transmitting mirror which reflects said measuring light to be projected toward said object via said objective lens;

wherein said rear surface is formed as a light receiving mirror which reflects said measuring light reflected by said object; and wherein said measuring light which is reflected by said object, subsequently passed through said objective lens and not interrupted by said reflection member, is reflected by said light receiving mirror to be selectively incident on said end of said one of said plurality of light-guiding optical systems in accordance with said distance from said surveying instrument to said object.

16. The surveying instrument according to claim 2, wherein said light shield mask has a sector shape.

17. The surveying instrument according to claim 6, wherein said light-receiving optical system comprises a wavelength selection mirror positioned between said reflection member and said focus adjustment lens.

18. A surveying instrument comprising:
a distance-measuring optical system having an objective lens via which a distance from said surveying instrument to an object is measured;
an optical distance meter which includes a reflection member positioned behind said objective lens, a light-transmitting optical system for transmitting a measuring light via said reflection member and said objective lens, and a light-receiving optical system for receiving light which is reflected by said object, subsequently passed through said objective lens and not interrupted by said reflection member, said light-receiving optical system comprising a light-guiding optical system, said measuring light which is reflected by said object being incident on an incident end surface of said light-guiding optical system, a diameter of said light-guiding optical system being determined so that said measuring light which is reflected by said object can be incident on said incident end surface of said light-guiding optical system regardless of said distance from said surveying instrument to said object; and
a light shield mask having a central aperture via which a central portion of said incident end surface is exposed with respect to said reflection member, and at least one side aperture via which an off-center portion of said incident end surface is exposed with respect to said reflection member, a diameter of each said at least one side aperture being smaller than a diameter of said central aperture.

19. The surveying instrument according to claim 18, wherein said at least one side aperture comprises at least two side apertures, a diameter of each of said at least two side apertures is smaller as said each of said at least two side apertures is farther from said central aperture.

20. The surveying instrument according to claim 18, wherein said at least one side aperture is communicatively connected with said central aperture.

21. The surveying instrument according to claim 20, wherein said light-guiding optical system comprises an optical fiber.

22. The surveying instrument according to claim 18, wherein said distance-measuring optical system comprises a sighting telescope for sighting said object.

23. The surveying instrument according to claim 18, wherein said reflection member is made of a parallel-plate mirror having front and rear surfaces parallel to each other;
wherein said front surface faces said objective lens and is formed as a light transmitting mirror which reflects said measuring light to be projected toward said object via said objective lens;
wherein said rear surface is formed as a light receiving mirror which reflects said measuring light reflected by said object; and
wherein said measuring light which is reflected by said object, subsequently passed through said objective lens and not interrupted by said reflection member, is reflected by said light receiving mirror to be incident on said incident end surface of said light-guiding optical system.

24. The surveying instrument according to claim 18, wherein said light shield mask has a disc shape.

25. A surveying instrument comprising:
a distance-measuring optical system having an objective lens via which a distance from said surveying instrument to an object is measured;
an optical distance meter which includes a reflection member positioned behind said objective lens, a light-transmitting optical system for transmitting a measuring light toward said object via said reflection member and said objective lens, and a light-receiving optical system for receiving light which is reflected by said object, subsequently passed through said objective lens and not interrupted by said reflection member; and
a focus detection device which detects a focus state of said distance-measuring optical system;
wherein said light-receiving optical system comprises:
a plurality of light-guiding optical systems;
a light shield mask having a plurality of apertures via which said measuring light reflected by said object is selectively incident on an end of one of said plurality of light-guiding optical systems in accordance with said distance from said surveying instrument to said object;
a moving device for moving said light shield mask so that said measuring light reflected by said object can be selectively incident on said end of said one of said plurality of light-guiding optical systems; and
a controller which controls said moving device to move said light shield mask so that said measuring light reflected by said object is incident on said end of said one of said plurality of light-guiding optical systems in accordance with said focus state that is detected by said focus detection device.

26. The surveying instrument according to claim 25, wherein diameters of said plurality of apertures are different from one another, said diameters of said plurality of light-guiding optical systems being identical to one another.

27. The surveying instrument according to claim 25, wherein diameters of said plurality of apertures are different from one another so that the diameters of said plurality of light-guiding optical systems correspond to the diameters of said plurality of apertures of the light shield mask.

28. The surveying instrument according to claim 25, wherein said distance-measuring optical system comprises a sighting telescope for sighting said object; and
wherein said focus detection device comprises a phase-difference detection type focus detection device which detects said focus state of said sighting telescope from a correlation between a pair of images respectively formed by two light bundles which are respectively passed through two different pupil areas on said objective lens; and
wherein elements of said optical distance meter are positioned so as not to interfere with said two different pupil areas.

29. The surveying instrument according to claim 25, wherein the central axes of the incident end surfaces of said plurality of light-guiding optical systems are positioned on a straight line.

30. The surveying instrument according to claim 25, wherein said light-receiving optical system comprises a light-receiving element on which said measuring light reflected by said object is incident via said plurality of light-guiding optical systems; and
wherein the central axes of the exit end surfaces of said plurality of light-guiding optical systems are positioned on a circle about an axis of said light-receiving element.

31. The surveying instrument according to claim 25, wherein said light-receiving optical system comprises a plurality of light-receiving elements on which said measuring light reflected by said object is incident via said plurality of light-guiding optical systems, respectively.

32. The surveying instrument according to claim 25, wherein each of said plurality of light-guiding optical systems comprises an optical fiber.

33. A surveying instrument equipped with an autofocus system, comprising:
- a distance-measuring optical system having an objective lens via which a distance from said surveying instrument to an object is measured;
- an optical distance meter which includes a reflection member positioned behind said objective lens, a light-transmitting optical system for transmitting a measuring light toward said object via said reflection member and said objective lens, and a light-receiving optical system for receiving light which is reflected by said object, subsequently passed through said objective lens and not interrupted by said reflection member;
- a focus detection device which detects a focus state of said distance-measuring optical system; and
- an autofocus mechanism for moving a focusing lens of said distance-measuring optical system to bring said object into focus in accordance with said focus state that is detected by said focus detection device, said autofocus mechanism comprising a lens position detection device which detects an axial position of said focusing lens;
- wherein said light-receiving optical system comprises:
  - a plurality of light-guiding optical systems;
  - a light shield mask having a plurality of apertures via which said measuring light reflected by said object is selectively incident on an end of one of said plurality of light-guiding optical systems in accordance with said distance from said surveying instrument to said object;
  - a moving device for moving said light shield mask so that said measuring light reflected by said object can be selectively incident on said end of said one of said plurality of light-guiding optical systems; and
  - a controller which controls said moving device to move said light shield mask so that said measuring light reflected by said object is incident on said end of said one of said plurality of light-guiding optical systems in accordance with said axial position of said focusing lens that is detected by said lens position detection device.

34. The surveying instrument according to claim 33, wherein diameters of said plurality of apertures are different from one another so that the diameters of said plurality of light-guiding optical systems correspond to the diameters of said plurality of apertures of the light shield mask.

35. The surveying instrument according to claim 33, wherein said distance-measuring optical system comprises a sighting telescope for sighting said object; and
- wherein said focus detection device comprises a phase-difference detection type focus detection device which detects said focus state of said sighting telescope from a correlation between a pair of images respectively formed by two light bundles which are respectively passed through two different pupil areas on said objective lens; and
- wherein elements of said optical distance meter are positioned so as not to interfere with said two different pupil areas.

36. The surveying instrument according to claim 33, wherein the central axes of the incident end surfaces of said plurality of light-guiding optical systems are positioned on a straight line.

37. The surveying instrument according to claim 33, wherein said light-receiving optical system comprises a light-receiving element on which said measuring light reflected by said object is incident via said plurality of light-guiding optical systems; and
- wherein the central axes of the exit end surfaces of said plurality of light-guiding optical systems are positioned on a circle about an axis of said light receiving element.

38. The surveying instrument according to claim 33, wherein said light-receiving optical system comprises a plurality of light-receiving elements on which said measuring light reflected by said object is incident via said plurality of light-guiding optical systems, respectively.

39. The surveying instrument according to claim 33, wherein each of said plurality of light-guiding optical systems comprises an optical fiber.

* * * * *